(12) United States Patent
Acosta et al.

(10) Patent No.: US 12,285,138 B2
(45) Date of Patent: Apr. 29, 2025

(54) ELECTRIC CORN CREAMER AND FOOD GRATER

(71) Applicants: Raul Acosta, Miami Lakes, FL (US); Rafael Acosta, Miami, FL (US)

(72) Inventors: Raul Acosta, Miami Lakes, FL (US); Rafael Acosta, Miami, FL (US)

( * ) Notice: Subject to any disclaimer, the term of this patent is extended or adjusted under 35 U.S.C. 154(b) by 331 days.

(21) Appl. No.: 17/991,769

(22) Filed: Nov. 21, 2022

(65) Prior Publication Data

US 2024/0164586 A1    May 23, 2024

(51) Int. Cl.
*A47J 43/25* (2006.01)
*A23L 19/00* (2016.01)

(52) U.S. Cl.
CPC .............. *A47J 43/25* (2013.01); *A23L 19/09* (2016.08); *A23V 2002/00* (2013.01)

(58) Field of Classification Search
CPC .. A47J 43/25; A47J 17/14; A47J 17/16; A23L 19/09; A23V 2002/00; A01F 11/06
See application file for complete search history.

(56) References Cited

U.S. PATENT DOCUMENTS

| | | | | |
|---|---|---|---|---|
| 2,609,852 A | * | 9/1952 | Houldsworth | A01F 11/06 460/56 |
| 10,213,043 B1 | * | 2/2019 | Pitman | A01F 11/06 |
| 2012/0325096 A1 | * | 12/2012 | Holt | A47J 17/16 99/567 |
| 2018/0184593 A1 | * | 7/2018 | Wong | A01F 12/18 |

* cited by examiner

*Primary Examiner* — Mohammed S. Alawadi
(74) *Attorney, Agent, or Firm* — Christopher J Vandam PA; Chris Van Dam

(57) ABSTRACT

A novel Electric Corn Creamer and Food Grater (the "Machine") designed to process tender ears of corn to obtain a corn paste in a single step by grating the kernels directly over the cob. The Machine may also be used to grate various types of products. In preferred embodiments, the Machine may be sized to be used as a small kitchen appliance, but alternative embodiments may be better suited for industrial applications. In some embodiments, the Machine may comprise various modules that can be easily attached and detached to facilitate cleaning and storage after each use.

7 Claims, 33 Drawing Sheets

ELECTRIC CORN CREAMER AND FOOD GRATER

FIELD OF THE INVENTION

The present invention relates to corn creamers and food graters. More particularly, the invention relates to an electric corn creamer capable of processing tender ears of corn to obtain a corn paste by grating the kernels directly over the cob. This machine can also be used to grate various types of food, including but not limited to some roots and vegetables.

BACKGROUND

Corn is consumed in many countries and regions in the world. The recipes are diverse, requiring processing the corn in various ways. Many recipes require a paste to be made from corn kernels when they are still tender. There are a few methods to obtain this corn paste. One way of achieving this is by holding the ear of corn with one hand and repeatedly rub it against a grater or keeping the ear of corn steady while rubbing the grater against it. These methods are very laborious, and often result in finger injuries, since it is easy for the hands to slip off the ear of corn, rubbing the hand or fingers directly over the grater, or to slide the grater over the fingers holding the ear of corn. For these reasons, these methods cannot be used by people who no longer have the dexterity and physical strength to carry out this task.

Another method is to separate the kernels from the cob and then grind the kernels in an electric or manual grain mill. Knives or other hand tools specifically designed for this purpose can be used to cut the kernels off the cob. In all cases, it is necessary for the person performing this task to use a sharp tool. This step may be dangerous as it can result in hand injuries. There are also other drawbacks to this method. For example, when cutting the kernels off the cob, the distance the kernels are cut relative to the cob may not be ideal. In some cases, the kernels may be cut too far from the cob, resulting in pieces of kernel being left on the cob which gets discarded, and in other cases, the cut may be too close to the cob, resulting in an excessive amount of chaff being taken along with the kernels, giving the corn paste an unwanted straw-like texture. Once the kernels are separated from the cob, it is necessary to grind them with a grain mill. This is a second, also laborious step required in this method to obtain the corn paste.

The complexity of all these methods and the inherent danger of physical injury, makes it impossible or discouraging for many people to prepare foods requiring a corn paste to be made from tender ears of corn.

There are other machines that have been designed to perform this task, however, all have considerable disadvantages. In some cases, the corn paste that is obtained is very coarse, with large pieces of kernels and even full kernels mixed with the paste, requiring the end product from these machines to be also processed by a grain mill to obtain the required paste consistency. In other cases, the existing machines are large and therefore not suitable for domestic use. Particularly, it would be impractical to put one of these large machines on the countertop of a home kitchen or similar space.

Considering all of the above, there is a need for a machine capable of processing tender ears of corn to obtain a paste safely, in a single step, with minimal effort from the user, that at the same time is small enough and easily operable to be considered a small kitchen appliance, so that it can be placed and operated on a regular kitchen countertop or similar space by any adult person.

BRIEF SUMMARY OF THE INVENTION

The present invention comprises a novel Electric Corn Creamer and Food Grater (the "Machine") designed to process tender ears of corn to create a corn paste by grating the kernels directly over the cob. The Machine can also be used to grate various types of products, including but not limited to some roots and vegetables.

In preferred embodiments of this invention, the Machine is sized and built to be used as a small kitchen appliance, but alternative embodiments may be better suited for industrial applications. In the particular embodiment described herein, the Machine consists of various modules that assemble to each other.

The bottom module (the "Motor Base") houses an electric motor with a coupler that provides rotational movement to the rest of the Machine. The main body of the Machine (the "Main Body") rests on top of the Motor Base and has a coupler to receive the rotational movement transmitted by the Motor Base. The Main Body also has a shaft and two gears to transmit the rotational movement to a grater (the "Conical Grater") that grates the ear of corn by rotating around it as the ear of corn is being pushed inside the Machine by the operator.

The Conical Grater is composed of several elements, including blades that adapt to the geometry of the ear of corn as it passes through the center circular opening of the Conical Grater. The Conical Grater is contained within a cylindrical section (the "Centrifuge") that is attached to the main body of the Machine and together with the Conical Grater, works as a centrifuge mechanism. The Centrifuge body also has a discharge channel through which the corn paste or other grated product comes out of the Machine.

The ear of corn is fed into the Conical Grater through a conduit that is part of another module (the "Funnel") that attaches to the Centrifuge. In between the end of the conduit and the Conical Grater, there are two rollers (the "Input Rollers") that prevent the ear of corn from rotating as it passes through the Conical Grater. In the Main Body, after the Conical Grater, there is a second set of two rollers (the "Output Rollers") that prevent the bare cob from rotating as it starts coming out of the Conical Grater and before the ear of corn finishes coming out of the Input Rollers.

The ear of corn is inserted into the Funnel by hand and subsequently pushed in with a manual pusher (the "Corn Baton"). The Corn Baton allows the ear of corn to be pushed until the bare cob comes completely out of the Machine.

To grate vegetables or other products, the Conical Grater is replaced by a different grater (the "Flat Grater") and a sleeve (the "Funnel Sleeve") is inserted into the Funnel. The Funnel Sleeve keeps the Input Rollers apart creating an unobstructed channel between the entrance of the Funnel and the Flat Grater blade. To push the vegetables or other products to be grated, a different manual pusher (the "Flat Grater Baton") is used.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
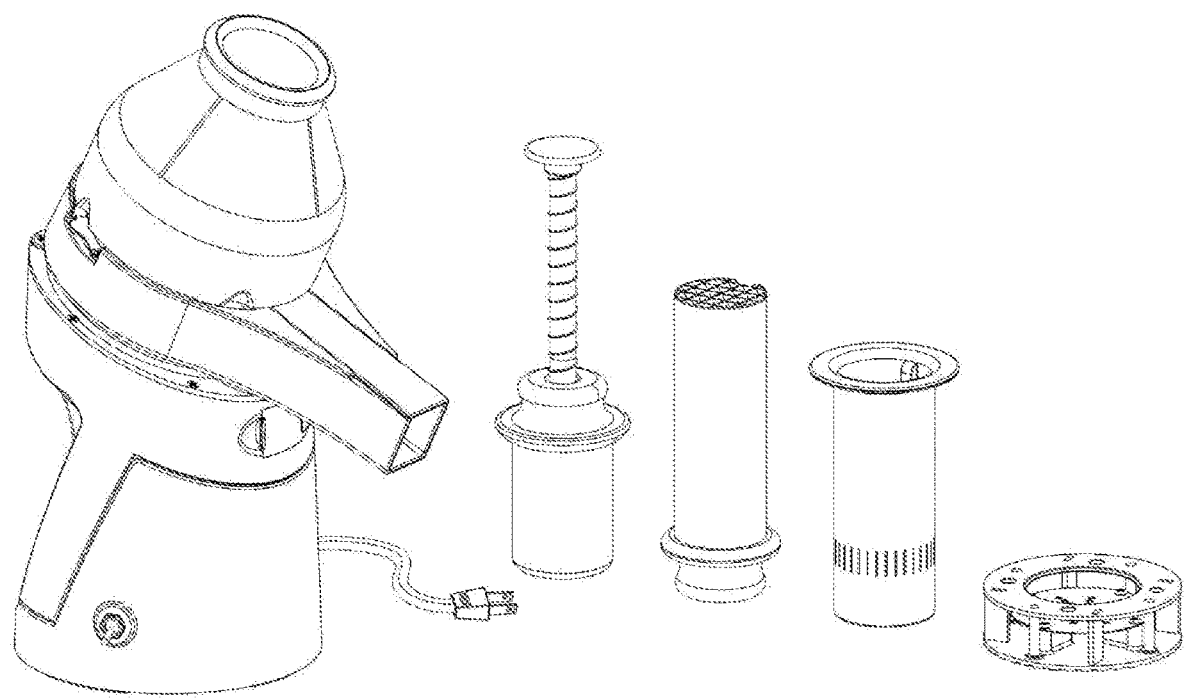
FIG. 1 depicts a perspective view of one example of an Electric Corn Creamer and Food Grater fully assembled, plus additional accessories according to various embodiments of the present invention.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification should be read with the understanding that such combinations are entirely within the scope of the invention.

New electric corn creamer and food grater devices, apparatuses, and methods for grating corn or other suitable food products are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by referencing the appended figures representing preferred embodiments. The figures depict modules, components and features. Modules may be composed of one or more components to perform one or more functions. Components identify individual objects which cannot be divided into other objects, or identify subassemblies that, within the scope of this detailed description, will be treated as a single object. Features identify physical characteristics of a component.

In the particular embodiment described herein, an Electric Corn Creamer and Food Grater is composed of various modules that may be easily attached and detached to facilitate cleaning and storage after each use. Each module works in conjunction with the other modules to perform the intended task, whether it is creating a corn paste from tender ears of corn or grating vegetables or other suitable products.

FIG. 1 depicts a perspective view of an example of an Electric Corn Creamer and Food Grater fully assembled plus additional accessories according to some embodiments of the present invention.

Figure 2:
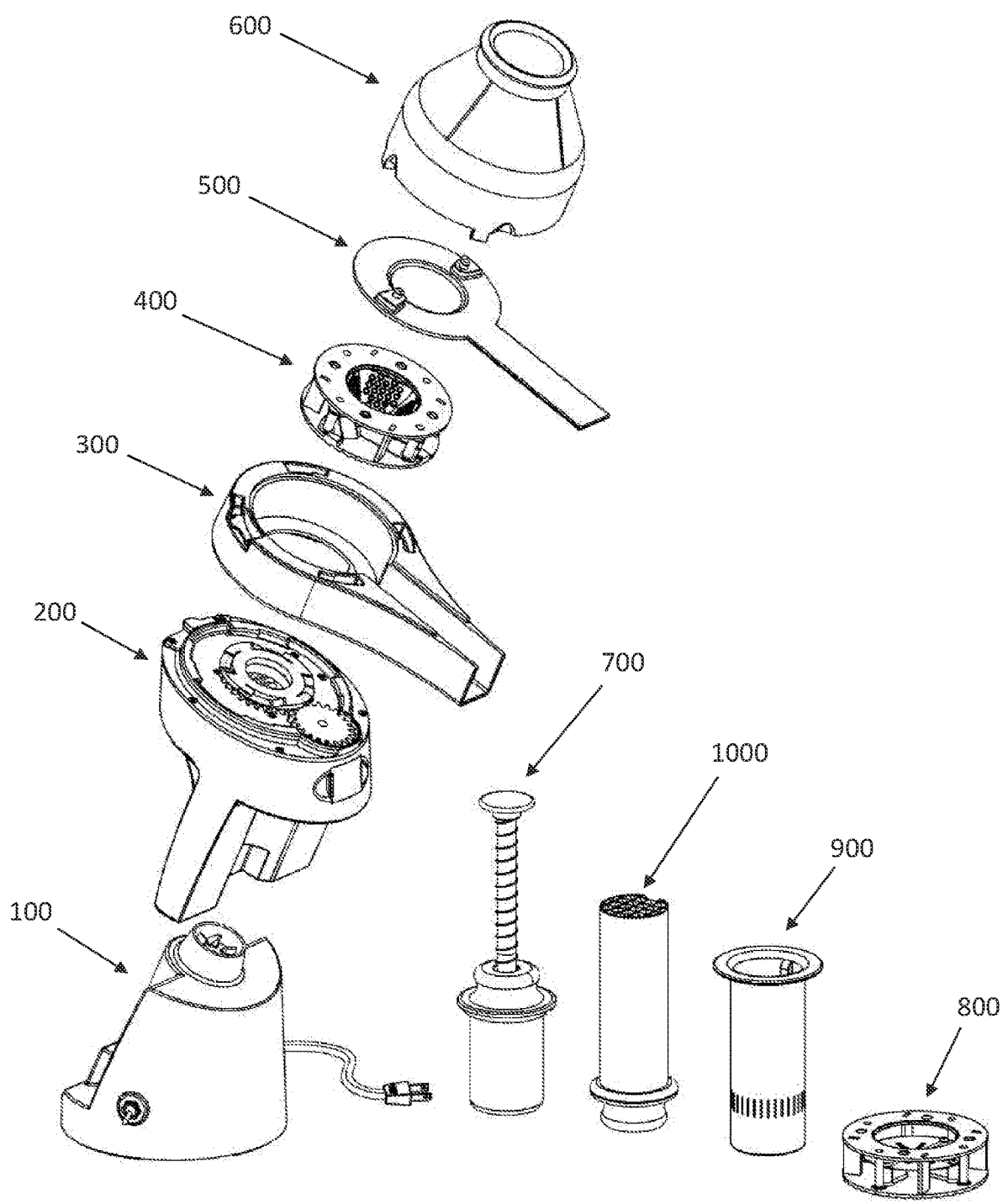
FIG. 2 depicts an exploded perspective view of one example of the modules comprising an Electric Corn Creamer and Food Grater according to various embodiments of the present invention.

FIG. 2 depicts an exploded perspective view of the Machine, identifying the modules comprising this particular embodiment. Module 100 is the Motor Base module. This module houses an electric Motor (103, FIG. 3) that provides rotational movement to the rest of the Machine. In this particular embodiment, the Motor Base module (100, FIG. 2) has a geometric shape that allows the Main Body (200, FIG. 2), to be attached to it by sliding the Main Body (200) over the Motor Base (100).

Figure 3:
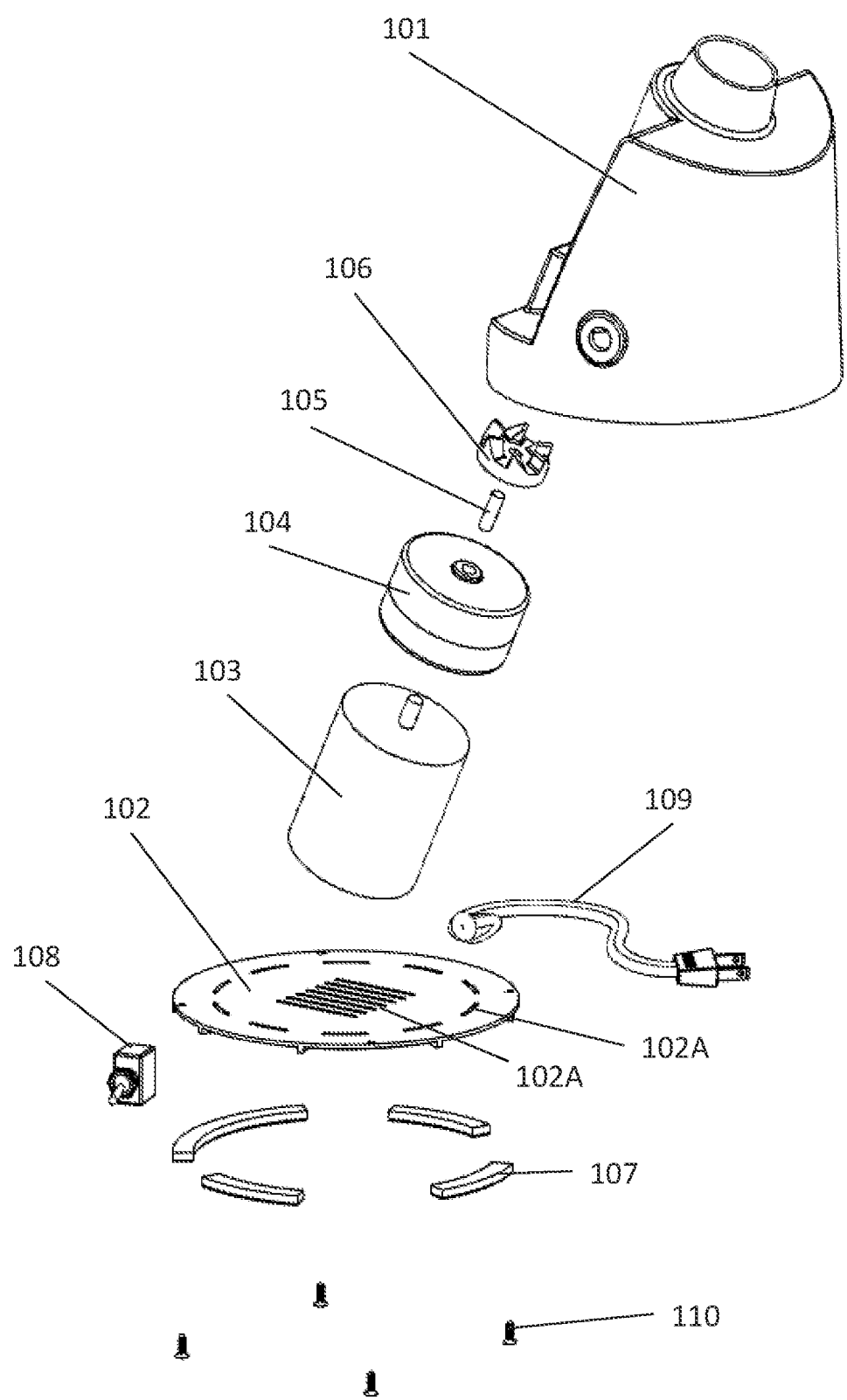
FIG. 3 depicts an exploded perspective view of one example of the components comprising the Motor Base module according to various embodiments of the present invention.

FIG. 3 shows an exploded perspective view of an example of the Motor Base module (100) showing its various main components. The internal wire harness is not represented, but electrical connections are described herein. In this particular embodiment, the components include a Motor Base Cover (102, FIG. 3), which is secured to the Motor Base Housing (101, FIG. 3) using four Screws (110, FIG. 3). The Motor Base (100) includes Anti-Slide Pads (107, FIG. 3) at the bottom. These Anti-Slide Pads (107) may be secured to the Motor Base Cover (102) or to the Motor Base Housing (101). In this particular embodiment, the Anti-Slide Pads (107) are inserted in slots on the bottom face of the Motor Base Cover (102), but in other embodiments, they can be secured in place by other methods, all of which are within the scope of this invention. The Anti-Slide Pads (107) can be made of any suitable high friction material to prevent the Machine from sliding during operation, including, but not limited to rubber. The Motor Base Cover (102) also has Ventilation Openings (102A, FIG. 3) to provide air flow to cool the Motor (103). The openings are distributed in a way that facilitates the circulation of air in and out of the Motor Base module (100) to improve Motor (103) cooling. FIG. 3 shows a possible distribution of these openings. The Motor Base Housing (101) and Motor Base Cover (102) may be made of aluminum, metal alloy, hard plastic, or other suitable food grade material.

The Motor Base module (100) includes a Power Cord (109, FIG. 3) ending in a power plug. The particular embodiment herein illustrated, shows a power plug consistent with a specific power plug standard, but other embodiments of this invention may use a different power plug type. The Power Cord (109) must be made of a wire gauge large enough to withstand without overheating the current drawn by the Motor (103) during an extended period of operation.

The Motor Base module (100) includes a Power Switch (108, FIG. 3) allowing the Machine to be turned ON and OFF. A wiring harness is installed inside the Motor Base (100) carrying the Line conductor from the Power Cord (109) to the Power Switch (108) and from the Power Switch (108) to one of the two connections of the Motor (103). The Neutral cable can be connected directly from the Power Cord (109) to the second Motor (103) connection. The Power Switch (108) must be rated according to the current consumption of the Motor (103).

The Motor (103) must provide enough torque and rotation speed for proper operation of the Machine. To achieve this, a Motor (103) with a higher rotation speed and lower torque may be used if connected to a rotation speed reduction mechanism. In the particular embodiment illustrated in FIG. 3, the Motor (103) shaft is connected to a Planetary Gear Reductor (104, FIG. 3), but other speed reduction mechanisms may be used. The rotation speed reduction mechanism design and conversion ratio depend on the Motor (103) shape and specifications. In other embodiments of this invention, the Motor (103) and the rotation speed reduction mechanism could be built as a single unit. The internal structure of the Motor Base Housing (101) must be adapted to accommodate the specific shape and dimension of the Motor (103) and the speed reduction mechanism if any. FIG. 3 illustrates a generic distribution of a Motor (103) and a Planetary Gear Reductor (104) to provide a general understanding of one possible configuration. Many variations of this configuration may be implemented, all resulting in providing rotation movement to the Output Coupler (106, FIG. 3) at the speed and torque required for the proper operation of the Machine.

Figure 4:
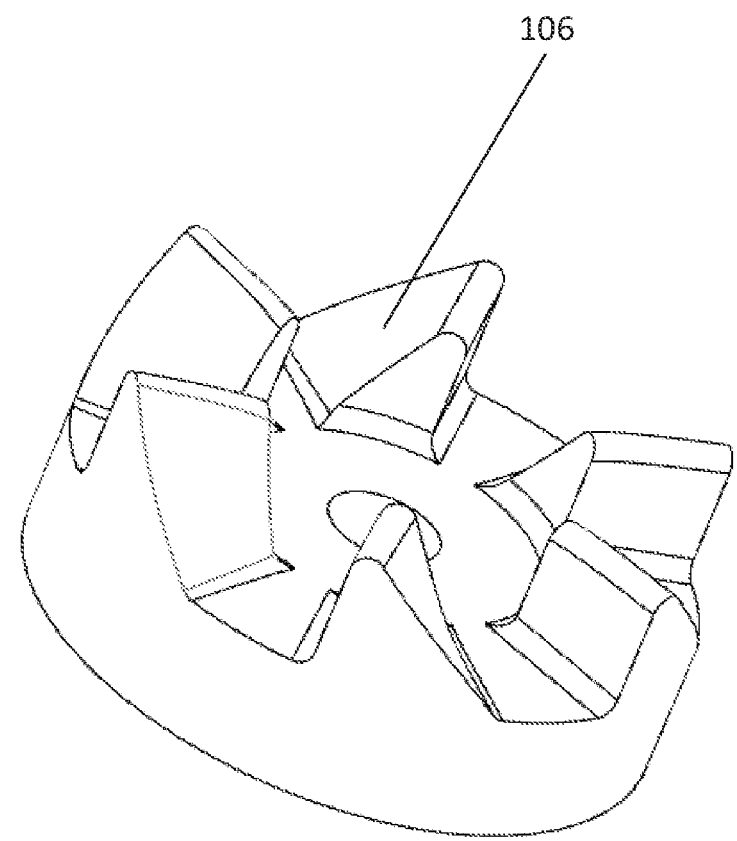
FIG. 4 depicts a perspective close-up view of one example of the Output Coupler according to various embodiments of the present invention.

The Output Coupler (106) is shaped so that it engages the matching coupler in the Main Body module (200) and movement is transmitted from one module to the other. At the same time, these couplers are shaped in a way that forces both couplers to rotate and align themselves to the matching coupler in the other module when the Main Body module (200) is slid in place and attached to the Motor Base module (100). These two functions can be achieved by using different coupler shapes. FIG. 4 illustrates one possible embodiment of this component. The Output Coupler (106) may be made of aluminum, metal alloy, hard plastic, or other suitable material.

The Output Coupler (106) is connected directly to the Motor (103) or to the rotation speed reduction mechanism, depending on the specific configuration used. In this particular embodiment, the Output Coupler is connected though a Connecting Shaft (105, FIG. 3) to a Planetary Gear Box (104) and the Planetary Gear Box (104) is connected to the Motor (103) shaft.

Figure 5:
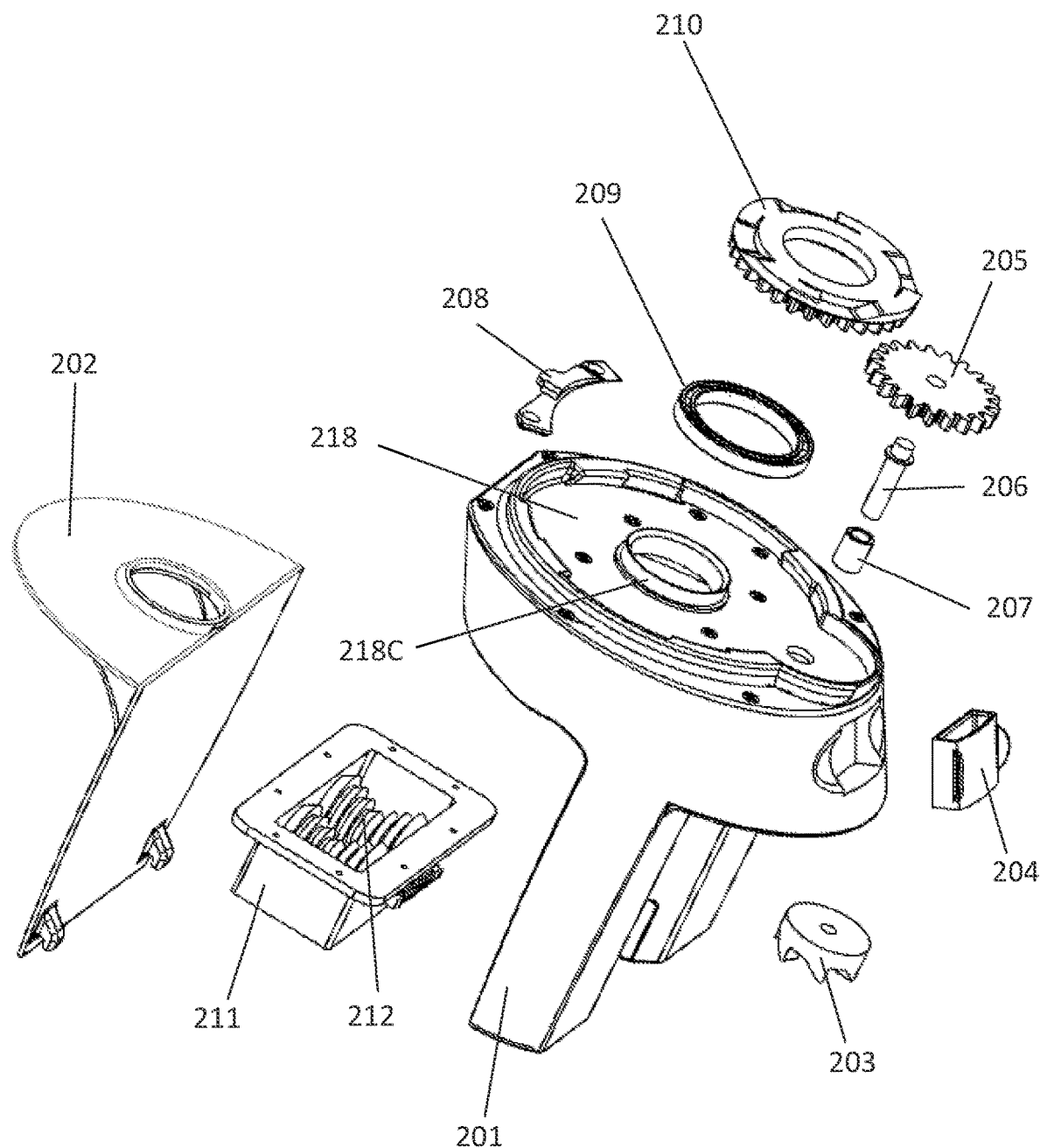
FIG. 5 depicts an exploded perspective view of one example of the components comprising the Main Body module according to various embodiments of the present invention.

Module 200 in FIG. 2 represents one example of the Main Body module. In this particular embodiment, this module sits on top of the Motor Base module (100), sliding in place using a matching shape that secures it in position without the need of a locking mechanism. The Main Body module (200) must be pulled upwards, requiring minimum effort, to remove it from the Motor Base (100). FIG. 5 shows an exploded perspective view of this module in this particular embodiment. The Main Body module (200) has an Input Coupler (203, FIG. 5) that connects to the Output Coupler (106) of the Motor Base module (100). The Input Coupler (203) has similar characteristics as those described for the Output Coupler (106) in a previous section herein.

The Input Coupler (203) is attached to a Shaft (206, FIG. 5) that transmits the rotation movement to a Spur Gear (205, FIG. 5) which connects to the Grater Seat (210, FIG. 5). The Input Coupler (203) and Spur Gear (205) may be made of metal alloy, hard plastic, or other material suitable for high-speed gears. In preferred embodiments, the Shaft (206) may be made of stainless steel or similar material and rotates inside a Bushing (207. FIG. 5) which can be made of low friction brass or similar low friction material.

Figure 6:
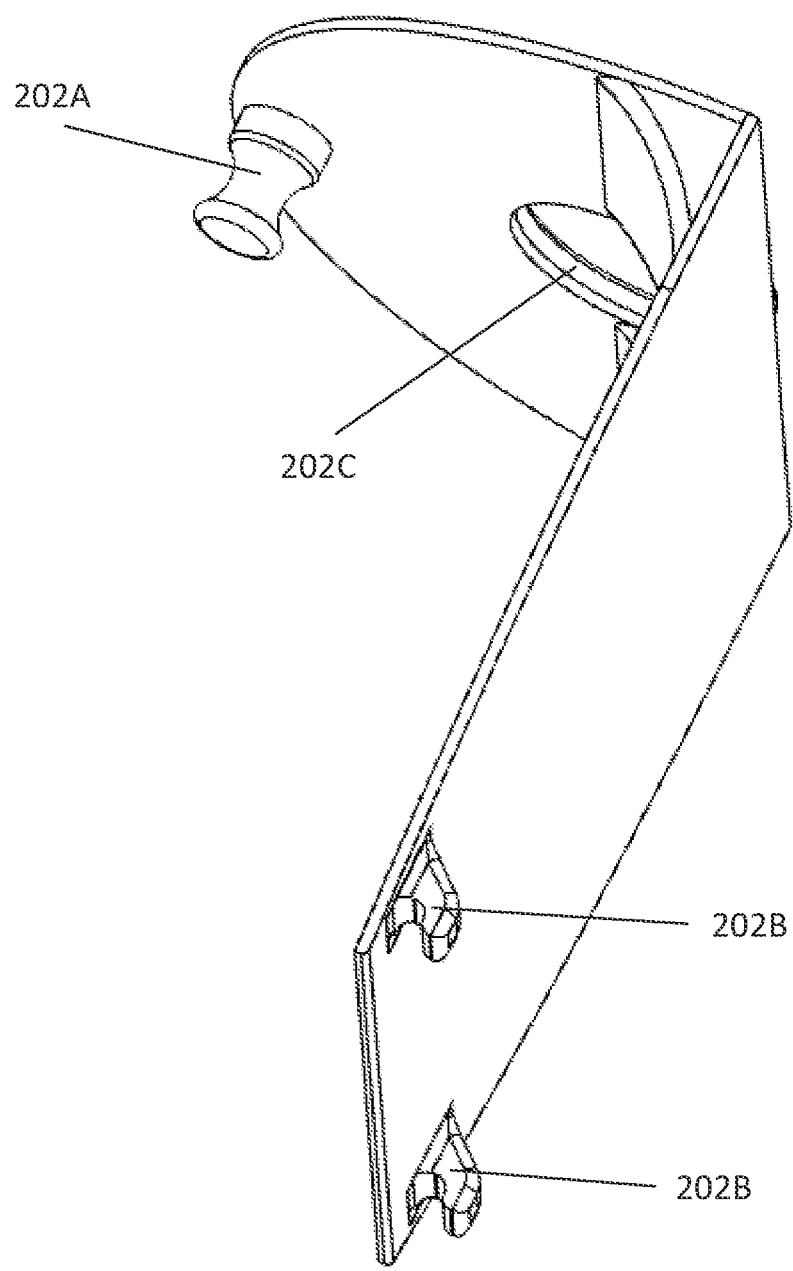
FIG. 6 depicts a perspective view showing in greater detail one example of the Removable Cover according to various embodiments of the present invention.

In this particular embodiment, the Main Body module (200) has a Removable Cover (202, FIG. 5) that snaps in place and can be easily removed by pulling it from the Knob (202A, FIG. 6). This Removable Cover (202) facilitates cleaning the inside of the Main Body module (200) after each use. The Removeable Cover (202) has two Hinges (202B, FIG. 6) that facilitate its installation and removal. Also, the Removeable Cover (202) has a circular opening (the "Exit Channel", 202C, FIG. 6) that allows the bare cob to exit the Main Body module (200). The Removable Cover (202) may be made of plastic or other suitable material that provides some degree of flexibility, necessary for its installation and removal from the Main Body Housing (201, FIG. 5)

Figure 7A:
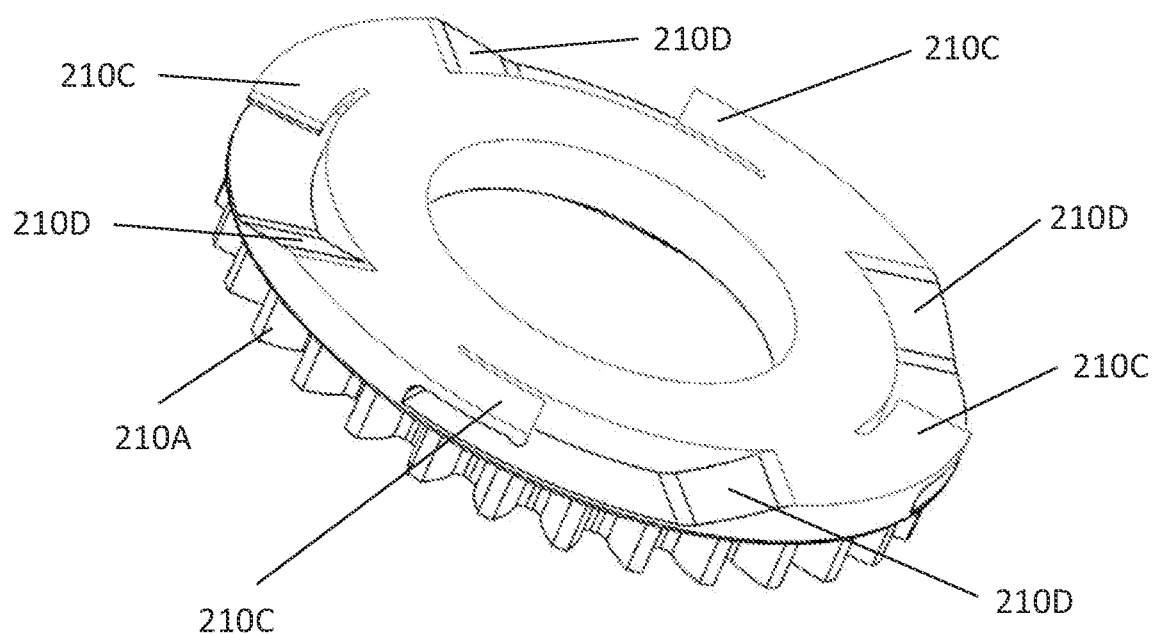
FIG. 7A depicts a close-up of a perspective top view of one example of the Grater Seat, according to various embodiments of the present invention.
Figure 7B:
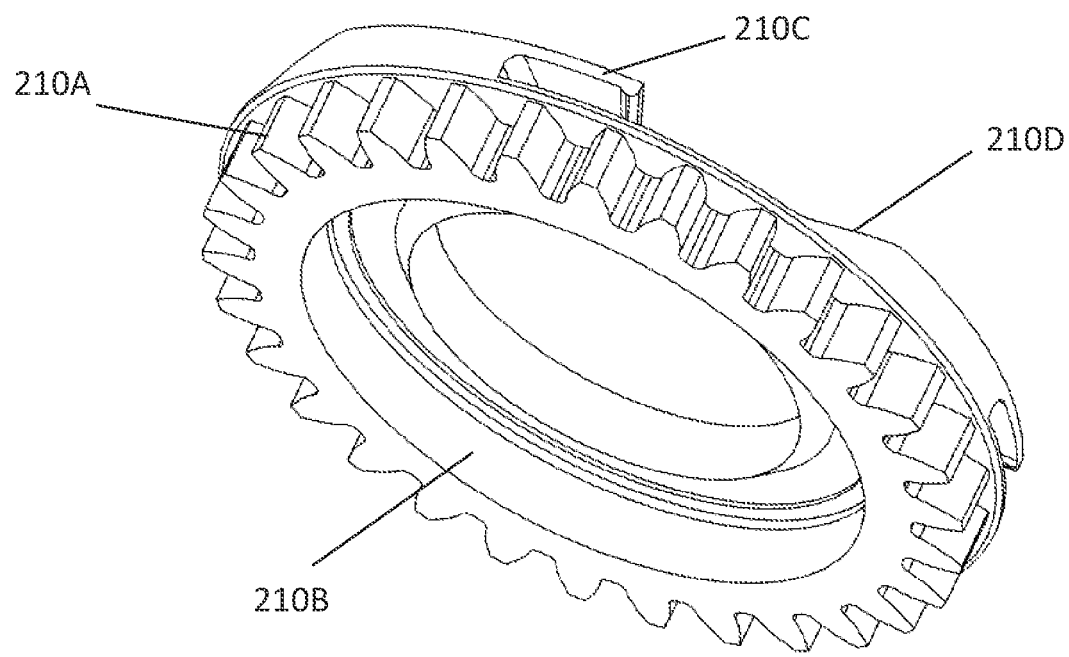
FIG. 7B depicts a close-up of a perspective bottom view of one example of the Grater Seat, according to various embodiments of the present invention.
Figure 25:
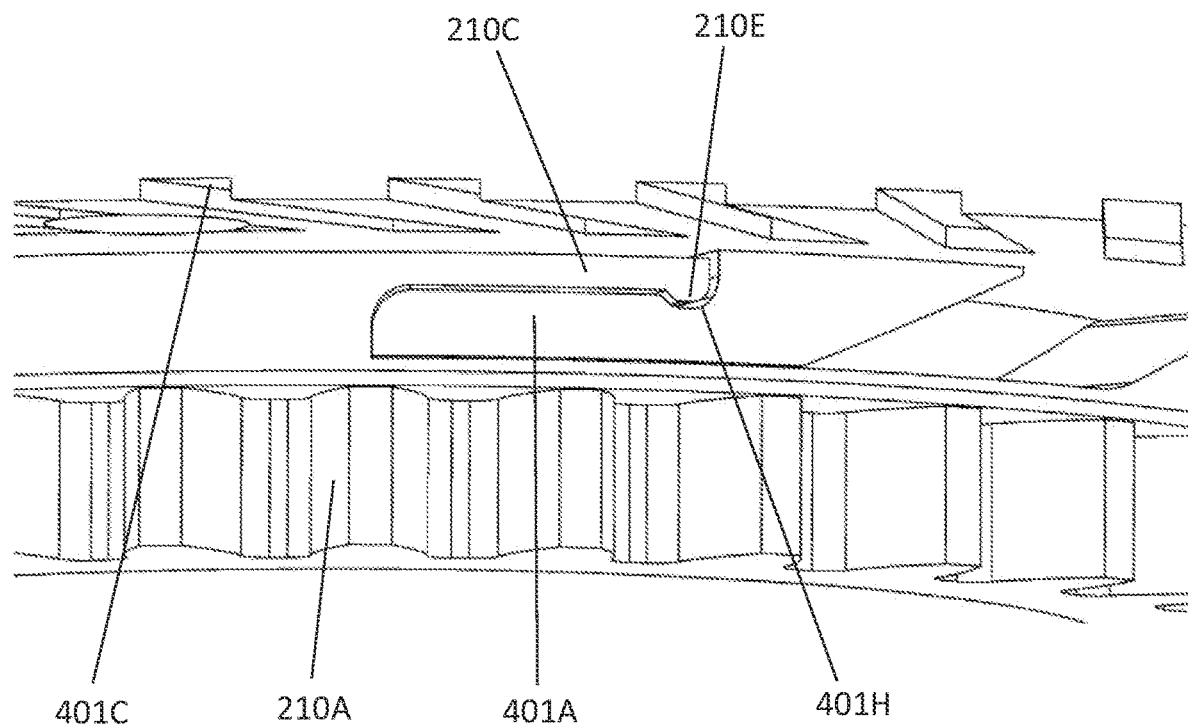
FIG. 25 depicts a perspective close up view showing in greater detail one example of the connection between the Grater Seat and the Grater module, according to various embodiments of the present invention.

An example of one embodiment of the Grater Seat (210), is illustrated in detail in FIG. 7. It has a built in Spur Gear (210A, FIG. 7B), a Ball Bearing Housing (210B, FIG. 7B) and a coupling mechanism to attach the Conical Grater module (400, FIG. 2) or Flat Grater module (800, FIG. 2) (the "Grater" module) to it. The coupling mechanism can be implemented in different ways. In this particular embodiment, this mechanism allows to attach the Grater module (400 or 800) with a small clockwise twist force. During the assembly of this particular embodiment, the four Flexible Tabs (210C, FIG. 7A) built in the Grater Seat (210) bend slightly to allow the four Rigid Tabs (401A, FIG. 16B) located on the bottom face of the Grater module (400 and 800) to slide under the four Flexible Tabs (210C). When fully inserted, a Tongue (210E, FIG. 25) and Groove (401H, FIG. 25) connection is engaged between each one of the four Flexible Tabs (210C) and their corresponding Rigid Tab (401A), allowing the four Flexible Tabs (210C) to straighten and secure the connection between the Grater Seat (210) and the Grater module (400 or 800). To disengage the Grater module (400 or 800) from the Grater Seat (210), a small twist force must be applied counterclockwise to the Grater module (400 or 800). One example of this Tongue (210E) and Groove (401H) connection fully engaged is shown in FIG. 25.

In this particular embodiment, the Grater Seat (210) has four ramps (the "Grater Seat Ramps" 210D, FIG. 7A) that, working in conjunction with the four ramps on the bottom face of the Grater module (400 or 800) (the "Grater Ramps" 401B, FIG. 16B), pushes the Grater module (400 or 800) away from the Grater Seat (210) when the Grater module (400 or 800) is rotated counterclockwise. This feature facilitates the removal of the Grater module (400 or 800) from the Main Body module (200). The Grater Seat (210) may be made of metal alloy, hard plastic, or other material suitable for high-speed gears, that, at the same time, provides some degree of flexibility to the four Flexible Tabs (210C). The bare cob passes through the center circular opening of the Grater Seat (210) after exiting the Conical Grater module (400).

Figure 9:
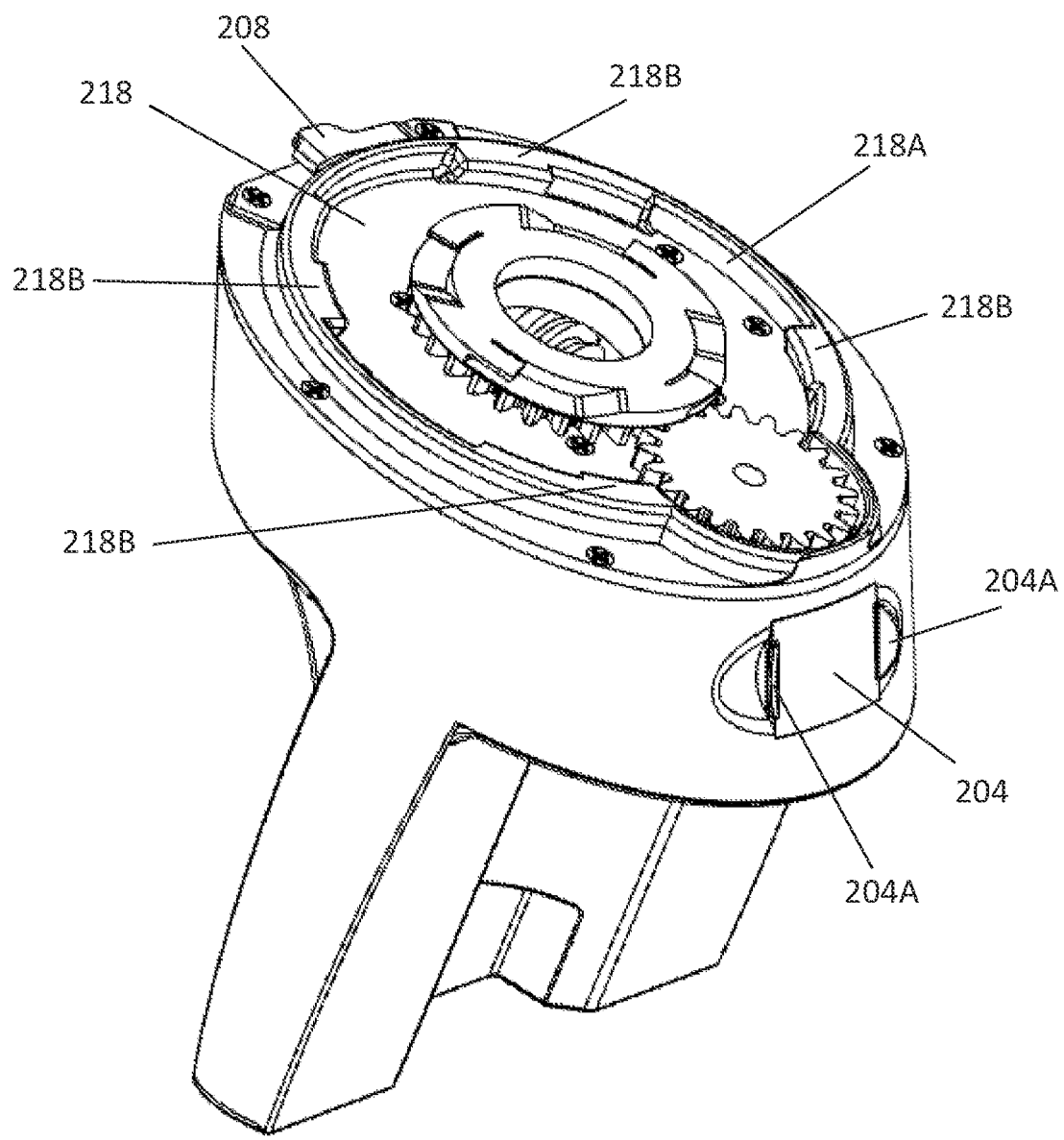
FIG. 9 depicts a perspective view of one example of the Main Body module showing in greater detail some of its components and features according to various embodiments of the present invention.

In this particular embodiment, the Grater Seat (210) is connected to the top cover of the Main Body Housing (the "Top Cover" 218, FIG. 9) through a Ball Bearing (209, FIG. 5), but other means of attachment that allows the Grater Seat (210) to rotate may be used, all of which are within the scope of this invention. The Ball Bearing Housing (210B) of the Grater Seat (210) is mounted on the outer ring of the Ball Bearing (209) and the inner ring of the Ball Bearing (209) is mounted on a cylindrical socket (the "Socket" 218C, FIG. 5) on the Top Cover (218). The Ball Bearing (209) must have a large enough inner diameter for the bare cob to pass through it and be made of stainless steel to avoid corrosion.

Figure 10:
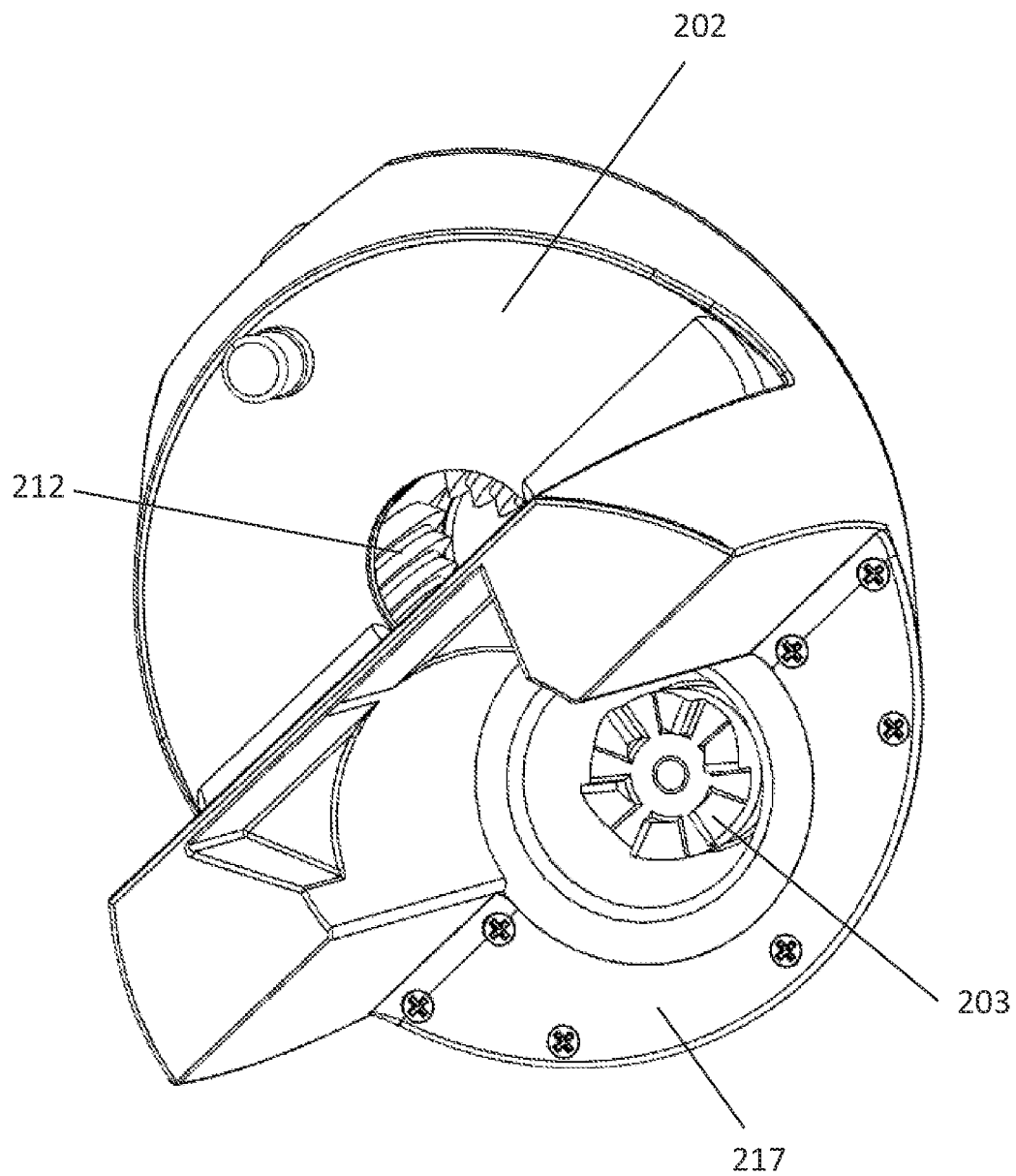
FIG. 10 depicts a perspective view of one example of the Main Body module showing in greater detail some of its components and features observed from a different angle, according to various embodiments of the present invention.

In this particular embodiment, the Main Body Housing (201) has a fixed cover (the "Back Cover", 217, FIG. 10) that is secured in place with screws. In other embodiments of this invention, the Back Cover (217) may be secured in place by other means or integrated with the Main Body Housing (201) as a single piece. The Back Cover (217) and the Main Body Housing (201) may be made of aluminum, metal alloy, hard plastic, or other suitable food grade material.

In this particular embodiment, the Main Body module (200) contains the Output Rollers, also referred to as "Cob Contacting Points" (212, FIG. 5) located underneath the Socket (218C, FIG. 5). The purpose of the Output Rollers (212) is to prevent the ear of corn from rotating once it is no longer in contact with the Input Rollers, also referred to as "Corn Contacting Points" (601, FIG. 13B), while exiting the Conical Grater module (400) and, at the same time, the Output Rollers (212) keep the ear of corn aligned with the Conical Grater module (400) until the bare cob fully exits the Machine.

Figure 33A:
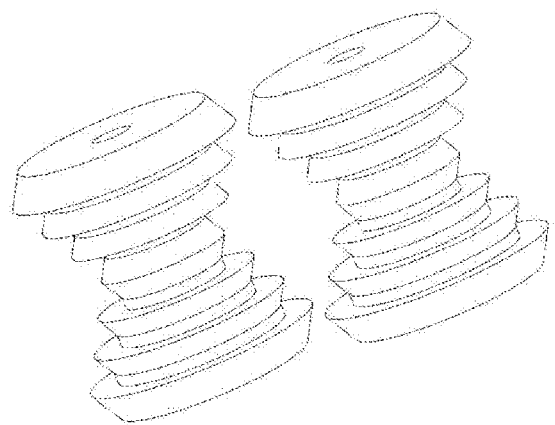
FIG. 33A depicts a perspective view of one example of the corn contacting points and cob contacting points in the form of rolling blades.
Figure 33B:
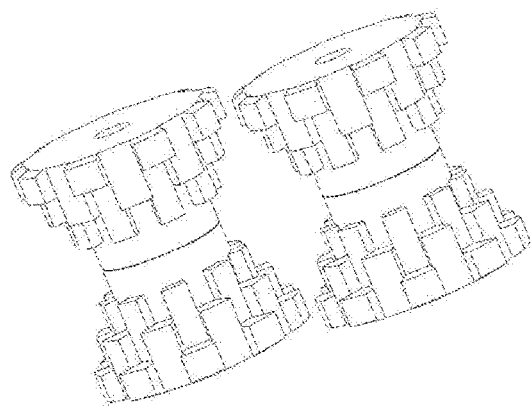
FIG. 33B depicts a perspective view of one example of the corn contacting points and cob contacting points in the form of rolling gears.
Figure 33C:
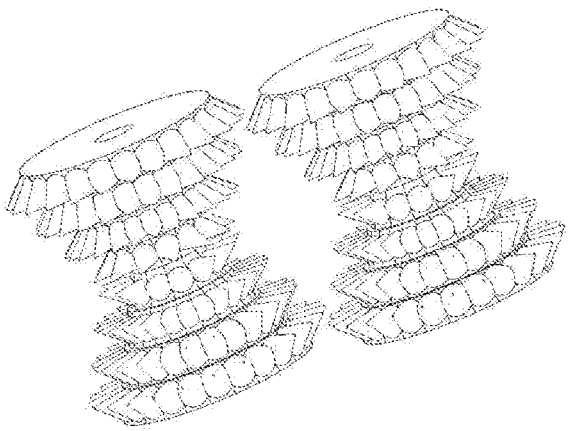
FIG. 33C depicts a perspective view of one example of the corn contacting points and cob contacting points in the form of rolling tines.
Figure 33D:
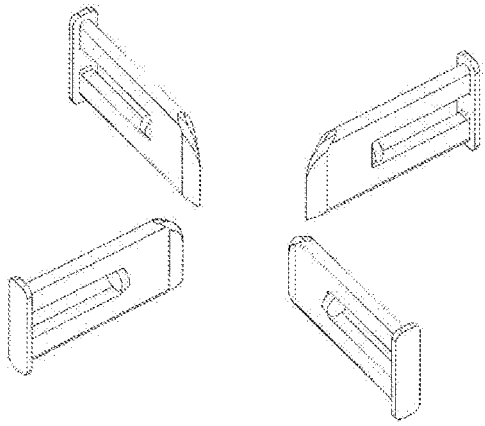
FIG. 33D depicts a perspective view of one example of the corn contacting points and cob contacting points in the form of straight blades.

The Corn Contacting Points (601) and the Cob Contacting Points (212) are any of rolling blades (FIG. 33A), rolling gears (FIG. 33B), rolling tines (FIG. 33C) or sliding blades (FIG. 33D), all of which are within the scope of this invention.

In this particular embodiment, the Output Rollers (212), are enclosed inside the Output Rollers Housing (211, FIG. 5) which is attached to the back of the Top Cover (218) by screws. In other embodiments, the Output Rollers Housing (211) may be attached to the Top Cover (218) by other means or integrated with the Top Cover (218) as a single piece.

In this particular embodiment, the Output Rollers (212) consist of two parallel rollers that can rotate individually. Each roller consists of several parallel circular blades which are of smaller diameter at the center of the roller and increasingly larger in diameter towards the edges of the roller. The Output Rollers (212) are pulled against each other by two Extension Springs (214, FIG. 8). The minimum distance between the Output Rollers (212) is enough to allow them to grab a relatively thin bare cob. The Output Rollers (212) can move away from each other as a thicker bare cob passes between them, holding the bare cob at all times due to the force exerted by the Extension Springs (214) pulling the Output Rollers (212) towards each other.

Figure 8:
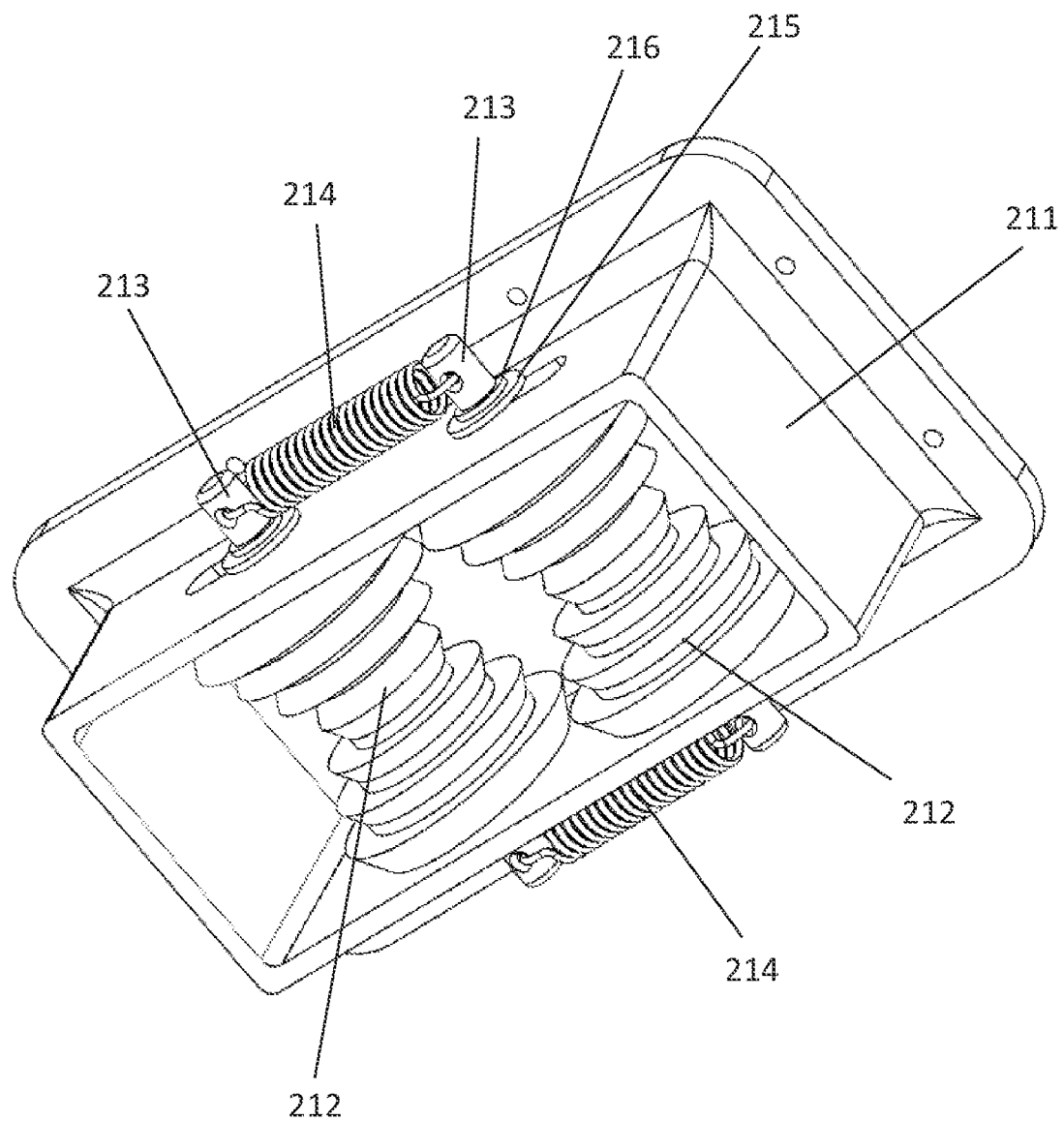
FIG. 8 depicts a perspective view showing in greater detail one example of the subassembly that contains the Output Rollers according to various embodiments of the present invention.

Each Output Roller (212) has a cylindrical opening throughout its length and is loosely mounted over an Axle (213, FIG. 8) that runs from side to side of the Output Rollers Housing (211). The two Axles (213) have circular grooves to secure them in place using Retaining Rings (216, FIG. 8) on each side. Spacers (215, FIG. 8) are placed between the Retaining Rings (216) and the sides of the Output Rollers Housing (211) to reduce friction. The Axles (213) slide through slots created on the side faces of the Output Rollers Housing (211) to allow the Output Rollers (212) to move close and away from each other. The Extension Springs (214) are connected to the ends of the Axles (213). This connection may be made in various ways. FIG. 8 depicts one embodiment where each Extension Spring (214) ends in a hook at each of its ends. These hooks are connected to the Axles (213) through a hole machined close to the edges of each Axle (213).

The Output Rollers Housing (211) and the Rollers (212), may be made of aluminum, metal alloy, hard plastic, or other suitable food grade material. The Axles (213) and the Spacers (215) may be made of a low friction material, including metal alloy, hard plastic or other suitable food grade material. The Retaining Rings (216) may be made of metal alloy, hard plastic or other suitable food grade material. In preferred embodiments, the Extension Springs (214) are made of stainless steel.

In this particular embodiment, the Top Cover (218) has a built-in Splash Guard (218A, FIG. 9) to avoid the splashing of corn paste or other grated products that might escape the Centrifuge module (300, FIG. 2) while in operation. Any splashing is in this way contained between the Top Cover (218) and the Centrifuge module (300). The splashed material runs by means of gravity towards the front lower section of the Top Cover (218) where there is an opening that drains any liquid residue to a Drip Collector (204, FIG. 5). The Drip Collector (204) can be removed and reinserted in a space on the front of the Main Body housing (201) with ease by holding the Drip Collector (204) from its Pulling Tabs (204A, FIG. 9).

Figure 11A:
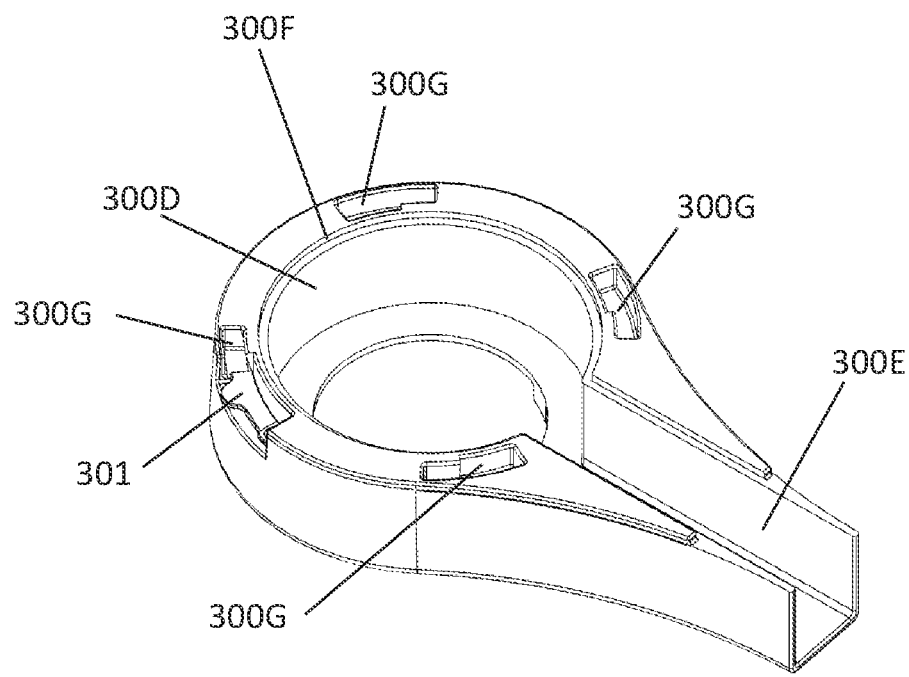
FIG. 11A depicts a perspective top view of one example of the Centrifuge module showing in greater detail some of its components and features, according to various embodiments of the present invention.
Figure 11B:
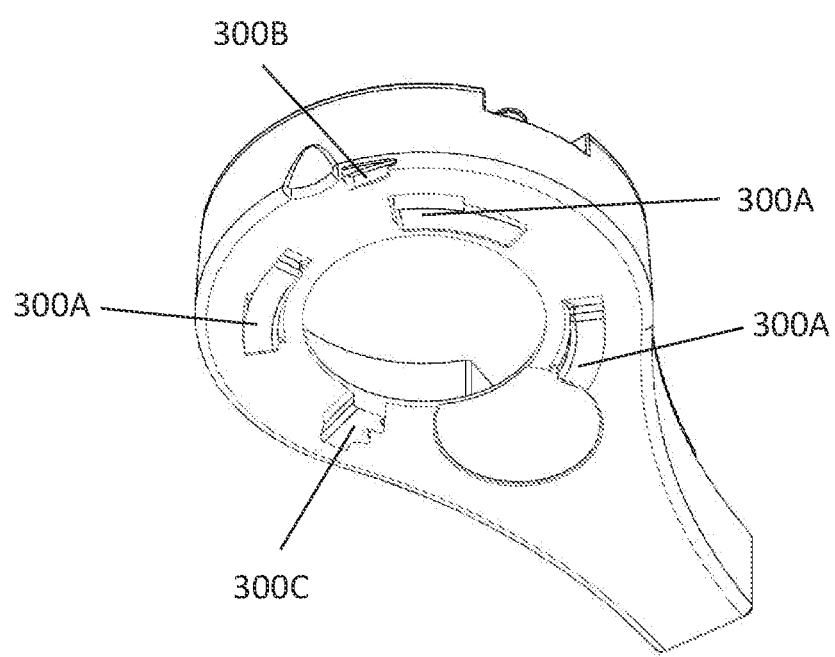
FIG. 11B depicts a perspective bottom view of one example of the Centrifuge module showing in greater detail some of its components and features, according to various embodiments of the present invention.

In this particular embodiment, the Main Body module (200) has four Coupling Blocks (218B, FIG. 9) These blocks allow the Centrifuge module (300), which also has similar Coupling Blocks (300A, FIG. 11B), to be placed on top of the Main Body module (200) and be secured in its operational position by a small counterclockwise turn of the Centrifuge module (300). Once the Centrifuge module (300) is installed in its operational position, it cannot be detached until it is rotated clockwise by the operator and then pulled upwards.

In this particular embodiment, the Main Body module (200) includes a locking mechanism that locks the Centrifuge module (300) on its operational position. There are many possible embodiments for this locking mechanism and all of them are within the scope of this invention. In this particular embodiment, this locking mechanism consists of a flexible tab (the "Centrifuge Locking Tab", 208, FIG. 9) located on the upper side of the Top Cover (218) and a small prong (the "Centrifuge Locking Prong", 300B, FIG. 11B) located on the bottom back side of the Centrifuge module (300). When the Centrifuge module (300) is rotated counterclockwise towards its operational position, the Centrifuge Locking Prong (300B) bends the Centrifuge Locking Tab (208). Once the Centrifuge module (300) reaches its operational position, the Centrifuge Locking Prong (300B) releases the Centrifuge Locking Tab (208) allowing it to straighten, acting as a barrier for the Centrifuge Locking Prong (300B). This way, the Centrifuge module (300) is locked in place, until the operator manually bends the Centrifuge Locking Tab (208) allowing the Centrifuge module (300) to be rotated clockwise and then pulled upwards to be removed from the Main Body module (200).

In this particular embodiment, the Top Cover (218) is an individual component attached to the Main Body Housing (201) with screws. In other embodiments, the Top Cover (218) could be secured in place by other means or may be integrated with the Main Body Housing (201) as a single piece. The Top Cover (218) and the Main Body Housing (201) may be made of aluminum, metal alloy, hard plastic, or other suitable food grade material.

The particular embodiment herein described for this Machine, requires a locking mechanism to avoid the rotation of the Grater Seat (210) in order to attach or detach the Grater module (400 or 800) from the Grater Seat (210). This mechanism can be implemented in multiple ways. The mechanism described herein serves as an example of one of the various possible embodiments of this mechanism.

An example of the Centrifuge module (300) is illustrated in FIG. 2. In this particular embodiment, a Toothed Block (300C, FIG. 11B) on the bottom surface of the Centrifuge module (300), acts as a locking mechanism for the Grater Seat (210). When the Centrifuge module (300) is fully turned clockwise, the Toothed Block (300C) engages the Spur Gear (205), not allowing it to rotate. Since the Spur Gear (205) is connected to the Grater Seat (210), the Grater Seat (210) is also not able to rotate. This allows the operator to attach and detach the Grater module (400 or 800) from the Grater Seat (210). A locking mechanism may not be required for different embodiments of the coupling mechanism between the Grater Seat (210) and the Grater module (400 or 800), all variants of which are within the scope of this invention.

The Centrifuge module (300) has a cylindrical space (the "Grater Housing", 300D, FIG. 11A) that houses the Grater module (400 or 800). The Grater Housing (300D) must be slightly larger in diameter than the outside diameter of the Grater module (400 and 800), so that there is no contact between the Grater module (400 or 800) and the Grater Housing (300D). Elements in the Grater module (400 and 800) later described herein, remove the corn paste or grated products off the wall of the Grater Housing (300D) and force them to exit the Centrifuge module (300) through the Centrifuge Discharge Channel (300E, FIG. 11A).

The Centrifuge module (300) has a Bevel (300F, FIG. 11A) around the top edge of the Grater Housing (300D) and the top edge of the Centrifuge Discharge Channel (300E) that allows the Centrifuge Cover module (500, FIG. 2) to lay flush with the top surface of the Centrifuge module (300). In this particular embodiment, this feature is required to allow the Funnel module (600, FIG. 2) to properly attach to the Centrifuge module (300) as later described herein.

In this particular embodiment, the Centrifuge module (300) has a feature on its top face that allows the Funnel module (600) to be attached to it. Many variants of this coupling mechanism may be implemented and all of them are within the scope of this invention. In this particular embodiment, the mechanism consists of four grooves (the "Funnel Locking Grooves", 300G, FIG. 11A), distributed in a circular pattern on the top face of the Centrifuge module (300) and four prongs (the "Funnel Locking Prongs", 600A, FIG. 13B) that extend from the bottom edge of the Funnel module (600).

To assemble the Funnel module (600) to the Centrifuge module (300), the Funnel Locking Prongs (600A) must be inserted into the Funnel Locking Grooves (300G) and the Funnel module (600) must be turned clockwise to lock it in place. To detach it, the Funnel module (600) must be rotated counterclockwise and then pulled upwards.

In this particular embodiment, the Centrifuge module (300) includes a locking mechanism (the "Funnel Locking Mechanism") that locks the Funnel module (600) on its operational position. There are many possible embodiments for this locking mechanism and all of them are within the scope of this invention. In this particular embodiment, this locking mechanism consists of a flexible tab (the "Funnel Locking Tab", 301, FIG. 11A) and any one of the four Funnel Locking Prongs (600A). When the Funnel module (600) is rotated clockwise towards its operational position, one of the four Funnel Locking Prongs (600A) bends the Funnel Locking Tab (301). Once the Funnel module (600) reaches its operational position, the Funnel Locking Prong (600A) releases the Funnel Locking Tab (301) allowing it to straighten, acting as a barrier for the Funnel Locking Prong (600A). This way, the Funnel module (600) is locked in place until the operator manually bends the Funnel Locking Tab (301) allowing the Funnel module (600) to be rotated counterclockwise and then pulled upwards to be removed from the Centrifuge module (300).

The Centrifuge module (300) may be made of aluminum, metal alloy, hard plastic, or other suitable food grade material.

Figure 12:
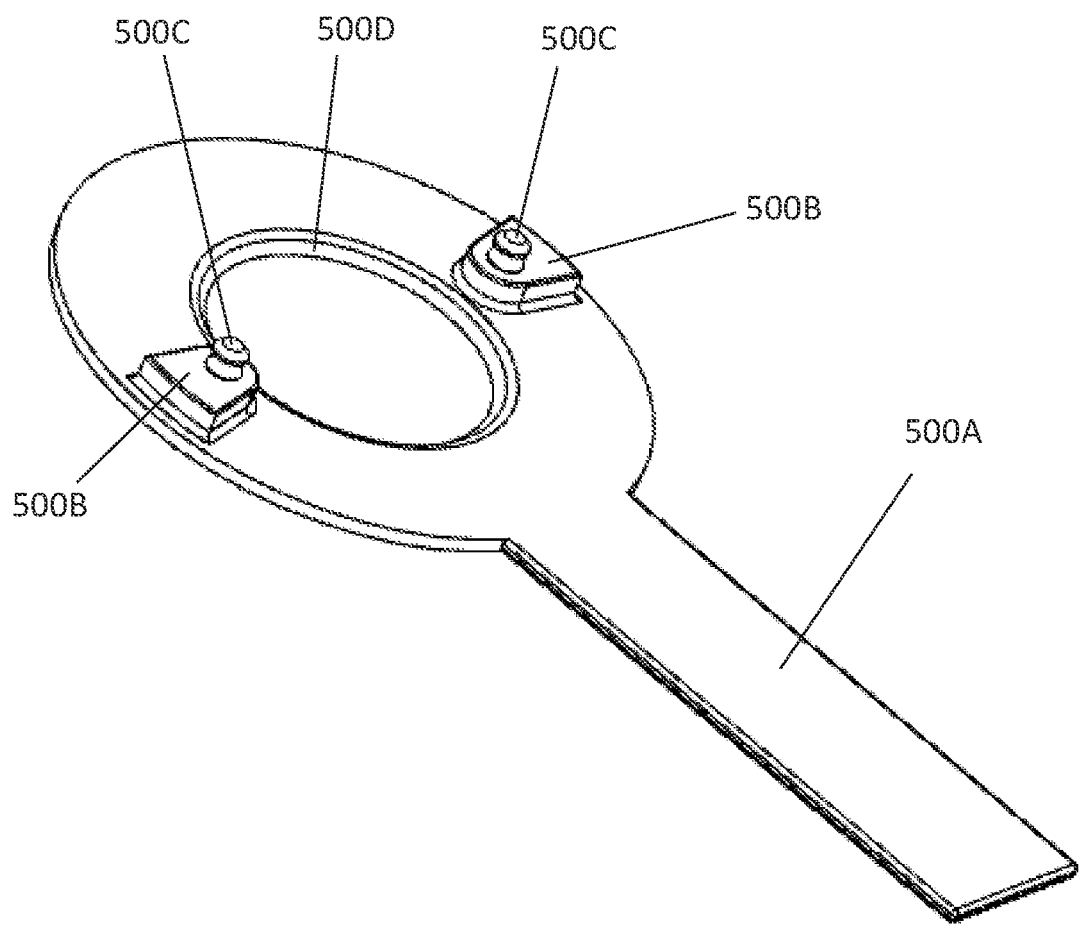
FIG. 12 depicts a perspective view of one example of the Centrifuge Cover module showing in greater detail some of its features, according to various embodiments of the present invention.

A detailed example of one embodiment of the Centrifuge Cover module (500) is shown in FIG. 12. In this particular embodiment, this module is built as a single piece and serves two purposes. During the Machine operation, this module serves as the cover of the Centrifuge module (300), preventing the corn paste or grated products from splashing upwards out of the Centrifuge module (300). The Centrifuge Cover module (500) is also used as a wrench to install and remove the Grater module (400 or 800) from the Grater Seat (210).

The Centrifuge Cover module (500) has two prongs on one side (the "Wrench Prongs", 500C, FIG. 12) that protrude from two elevated sections (the "Wrench Spacers", 500B, FIG. 12). To use it as a wrench, the Centrifuge Cover module (500) is held with one hand by its elongated rectangular section (the "Wrench Handle", 500A, FIG. 12), and the Wrench Prongs (500C) are inserted into two of the four circular openings (the "Mounting Holes", 402A, FIG. 16A) located diametrically opposed on the top face of the Grater module (400 and 800) so it can be rotated clockwise to install it or counterclockwise to remove it from the Grater Seat (210).

When the Centrifuge Cover module (500) is used as a cover, the Spacers (500B) prevent the operator from installing the Centrifuge Cover module (500) in the wrong position. The Centrifuge Cover module (500) must be installed with the Wrench Prongs (500C) pointing upwards. If the operator tries to install the Centrifuge Cover module (500) with the Wrench Prongs (500C) pointing downwards, they might be inserted in the Mounting Holes (402A), but the Spacers (500B) would lay on top of the Grater module (400 or 800), keeping the Centrifuge Cover module (500) separated from the Bevel (300F) of the Centrifuge module (300) making impossible to attach the Funnel module (600) to the Centrifuge module (300).

The Centrifuge Cover has a central aperture dimensioned to longitudinally receive the ear of corn. (the "Centrifuge Cover Aperture", 500D, FIG. 12).

The Centrifuge Cover module (500) may be made of aluminum, metal alloy, hard plastic, or other suitable food grade material.

Figure 13A:
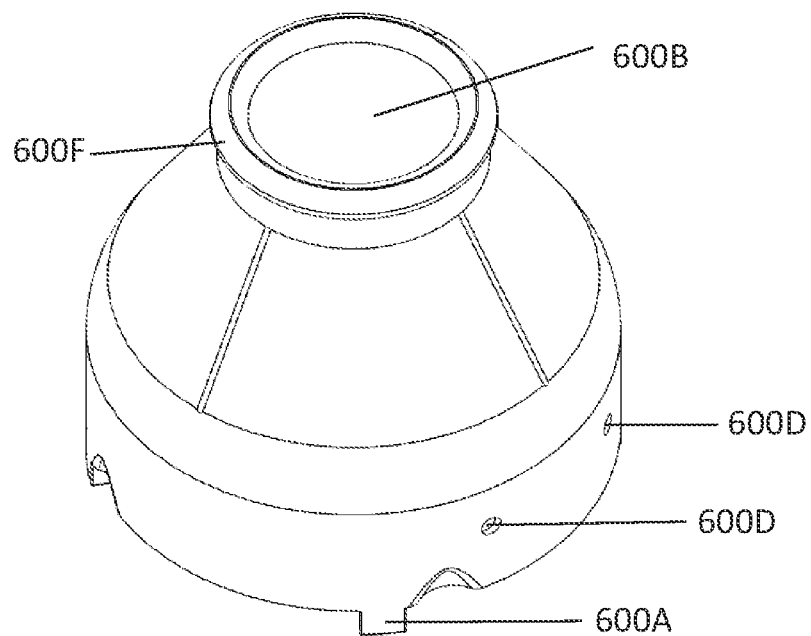
FIG. 13A depicts a perspective top view of one example of the Funnel module showing in greater detail some of its components and features, according to various embodiments of the present invention.
Figure 13B:
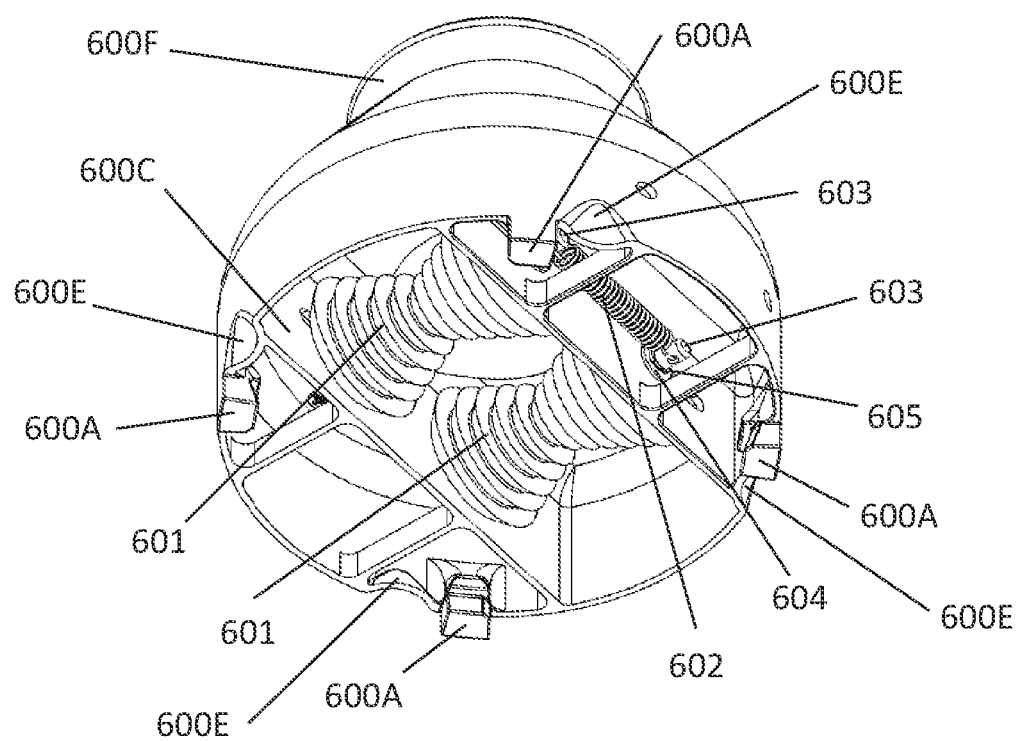
FIG. 13B depicts a perspective bottom view of one example of the Funnel module showing in greater detail some of its components and features, according to various embodiments of the present invention.
Figure 28:
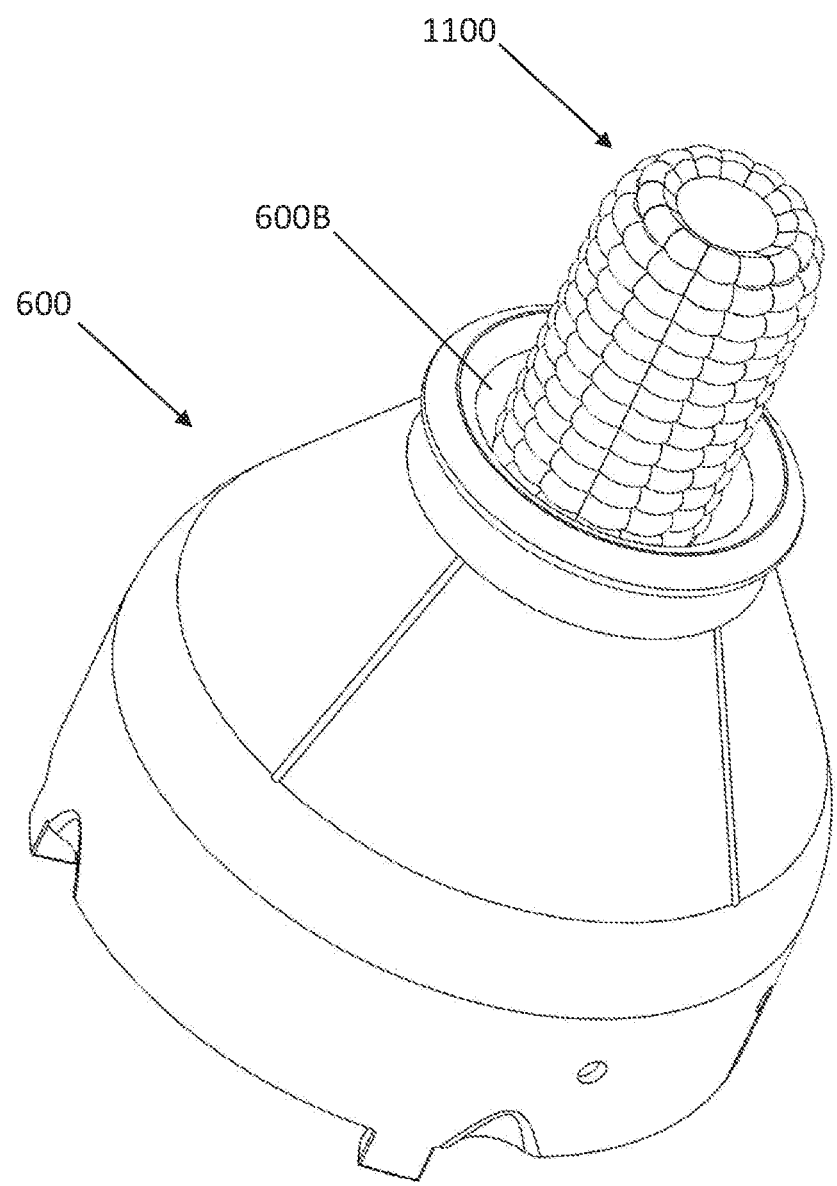
FIG. 28 depicts a perspective view of one example of the funnel module with an ear of corn inserted in the feeding channel.
Figure 29A:
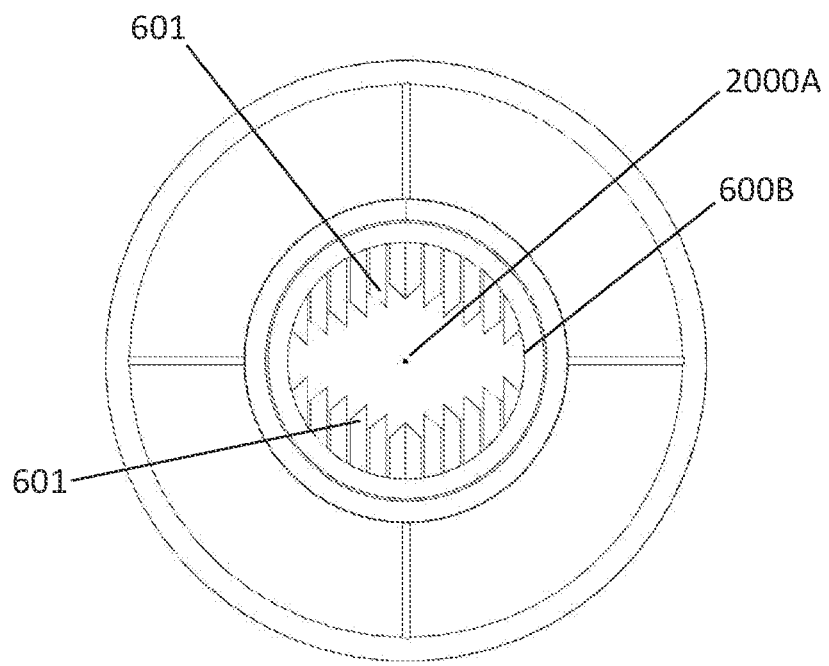
FIG. 29A depicts a top view of one example of the funnel module showing the corn contacting points symmetrically oriented around a central axis.
Figure 29B:
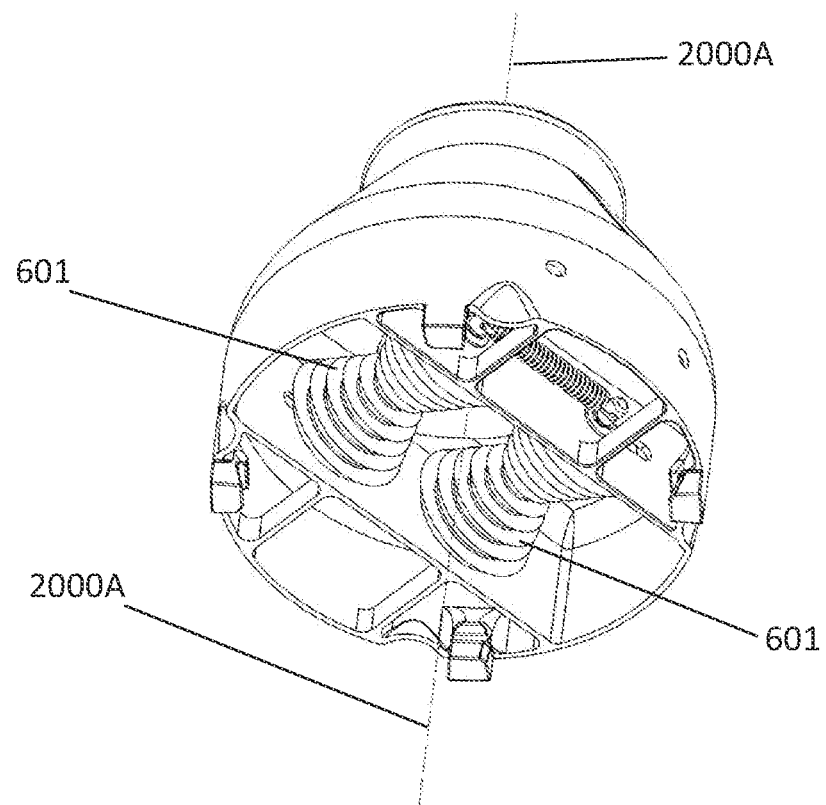
FIG. 29B depicts a perspective bottom view of one example of the funnel module showing the central axis relative to the funnel module geometry.
Figure 30A:
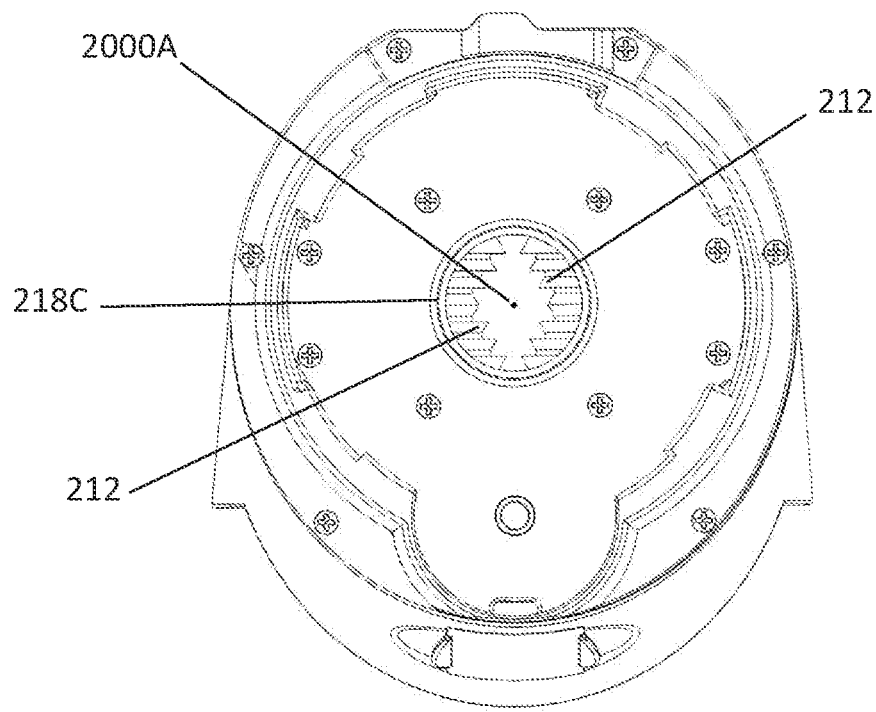
FIG. 30A depicts a top view of one example of the main module showing the cob contacting points symmetrically oriented around a central axis.
Figure 30B:
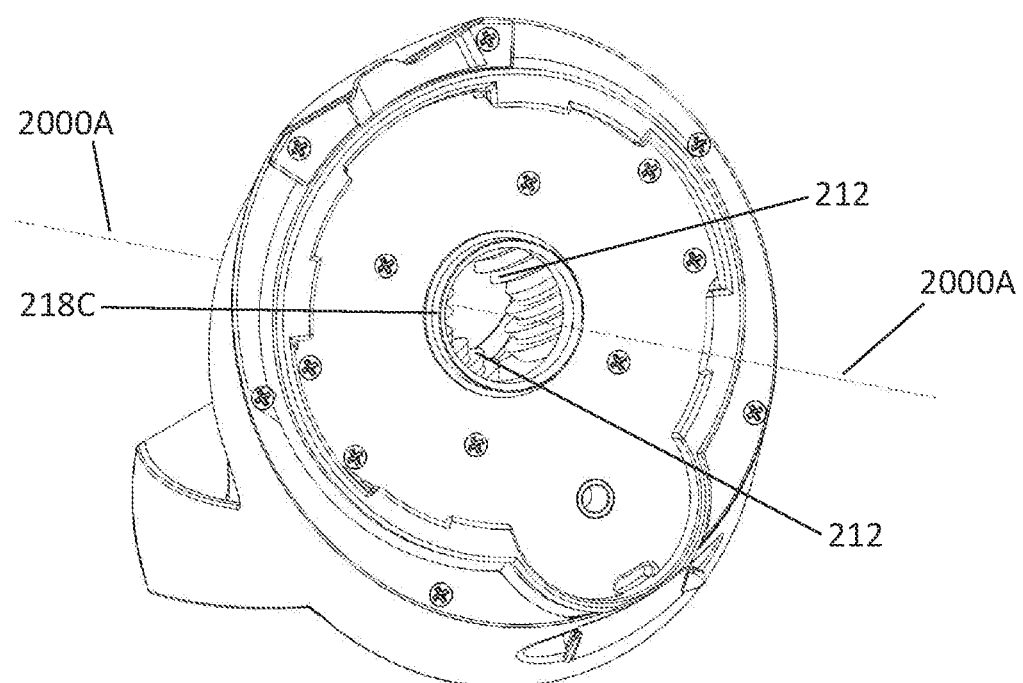
FIG. 30B depicts a perspective top view of one example of the main module showing the central axis relative to the main module geometry.

FIG. 13A and FIG. 13B illustrate an example of one embodiment of the Funnel module (600). In this particular embodiment, this module attaches to the top face of the Centrifuge module (300) using the Funnel Locking Prongs (600A) described in a previous section. The Funnel module 600) has a cylindrical opening (the "Feeding Channel", 600B, FIG. 13A) through which the ears of corn (1100) are fed into the Machine (FIG. 28). The diameter of the Feeding Channel (600B) determines the maximum diameter of the ears of corn the Machine can process. Once inserted into the Feeding Channel (600B), a corn cob may be long enough to protrude from the top edge of the Feeding Channel (600B). This is not a problem since the Feeding Channel (600B) is long enough to hold such corn in place, so the corn cob does not fall out. The corn cob is then pushed further inside the Machine using the Corn Baton module (700, FIG. 2).

Figure 14:
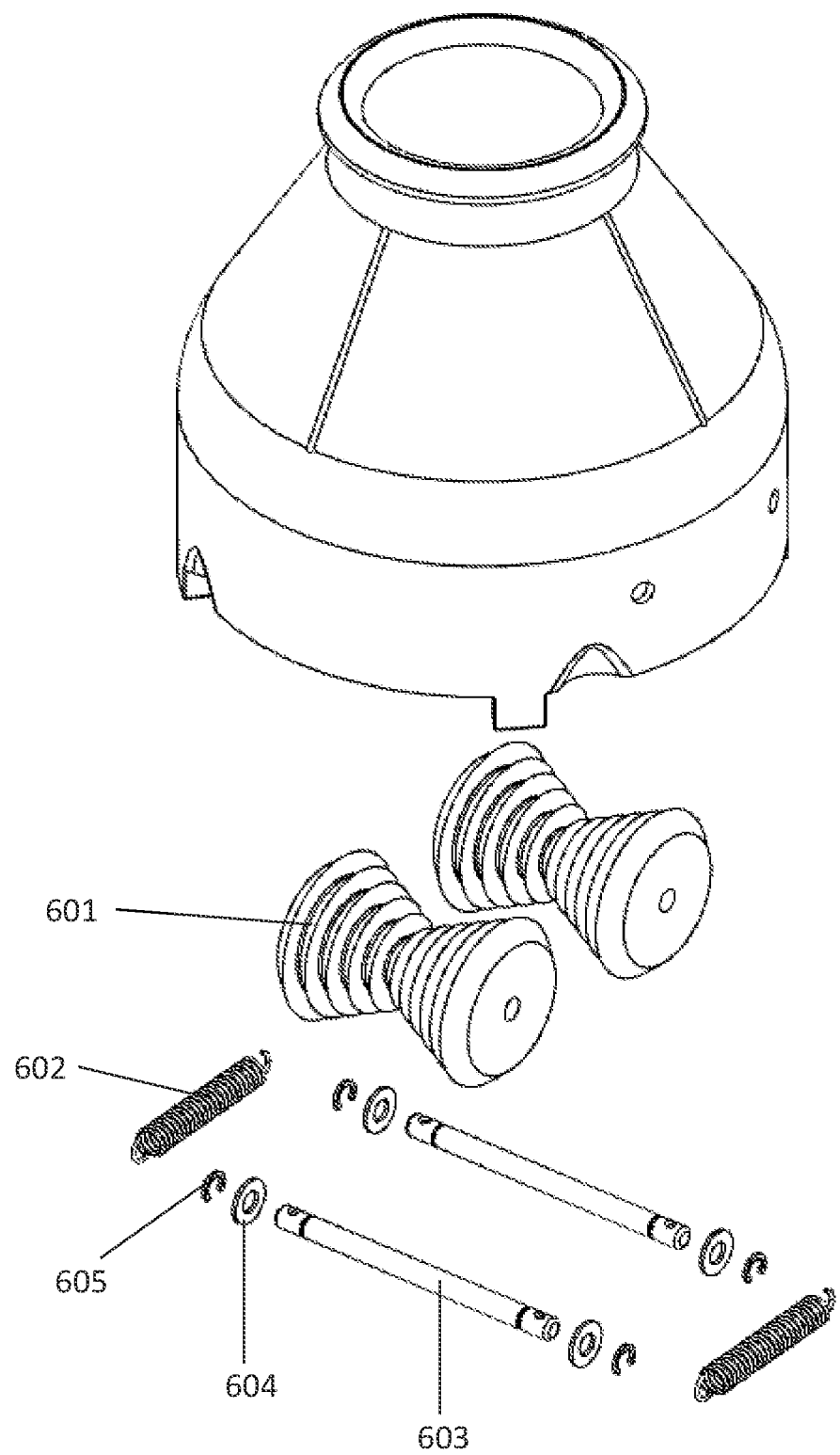
FIG. 14 depicts an exploded perspective view of one example of the components comprising the Funnel module according to various embodiments of the present invention.

In this particular embodiment, at the bottom end of the Feeding Channel (600B), there are two parallel rollers (the "Input Rollers", 601) contained in a chamber (the "Input Rollers Housing", 600C, FIG. 13B). The Input Rollers (601) are similar in shape, functionality, and material to the Output Rollers (212) described in previous sections. However, the Input Rollers (601) are larger than the Output Rollers (212). This is because the corn cob going into the Machine has a larger diameter than the bare cob exiting the Machine. Consequently, the two Extension Springs (602, FIG. 13B) used with the Input Rollers (601) are longer than the Extension Springs (214) used with the Output Rollers (212). The two Axles (603, FIG. 13B) used with the Input Rollers (601) are also longer than the Axles (213) used with the Output Rollers (212). The Retaining Rings (605, FIG. 13B) and the Spacers (604, FIG. 13B) may be the same size as the Retaining Rings (216) and Spacers (215) used with the Output Rollers (212). FIG. 14 provides an exploded perspective view of an example of one embodiment of the Funnel module (600) for better understanding of the components that may comprise this module. Since the functionality of the Output Rollers (212) and the Input Rollers (601) is similar, FIG. 14 can also be referenced to have a better understanding of the components and features associated with the Output Rollers (212).

The two Holes (600D, FIG. 13A) located on the exterior body of the Funnel module (600) shown in this example, are used to slide the Axles (603) inside the Input Rollers Housing (600C) during the Funnel module (600) factory assembly process of this particular embodiment. Other embodiments of this module may not require these Holes (600D) and those variants are all within the scope of this invention.

In this particular embodiment, four Indentations (600E, FIG. 13B) are located along the perimeter of the bottom edge of the Funnel module (600). The purpose of these four Indentations (600E) is to facilitate reaching the Funnel Locking Tab (301), so the operator can easily place a finger over the Funnel Locking Tab (301) to disengage the Funnel Locking Mechanism. The four Indentations (600E) are identical, and the four Funnel Locking Prongs (600A) located along the perimeter of the bottom edge of the Funnel module (600) are also identical. This feature allows the Funnel module (600) to be attached to the Centrifuge module (300) in any one of four possible positions.

In the particular embodiment illustrated herein, the Funnel module (600) is built with a conical shape profile on its upper section with the entrance of the Feeding Channel (600B) located at the narrow end of the cone. Around the perimeter of the entrance of the Feeding Channel (600B) there is a protruding edge (the "Funnel Holder", 600F, FIG. 13A) that helps the Funnel module (600) to be lifted without the risk of it slipping from the operator's hand.

The Funnel module (600) may be made of aluminum, metal alloy, hard plastic, or other suitable food grade material.

Figure 15A:
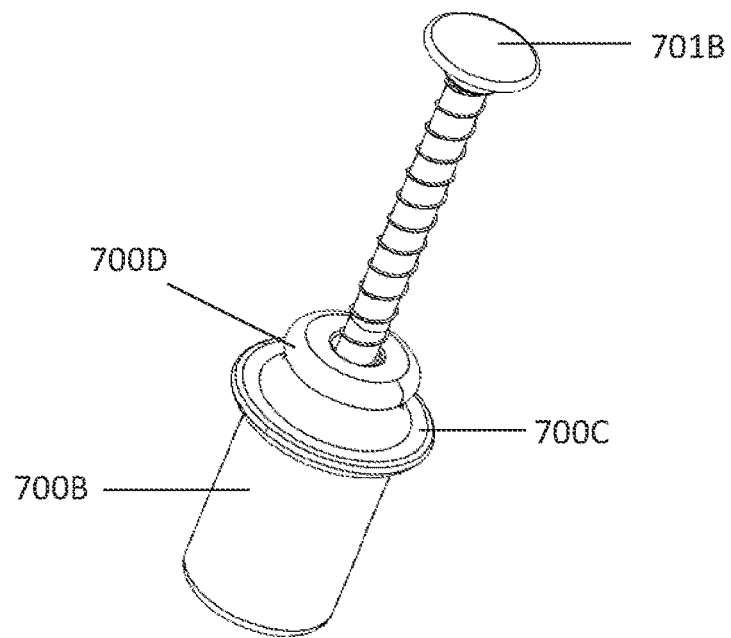
FIG. 15A depicts a perspective view of one example of the Corn Baton module according to various embodiments of the present invention.
Figure 15B:
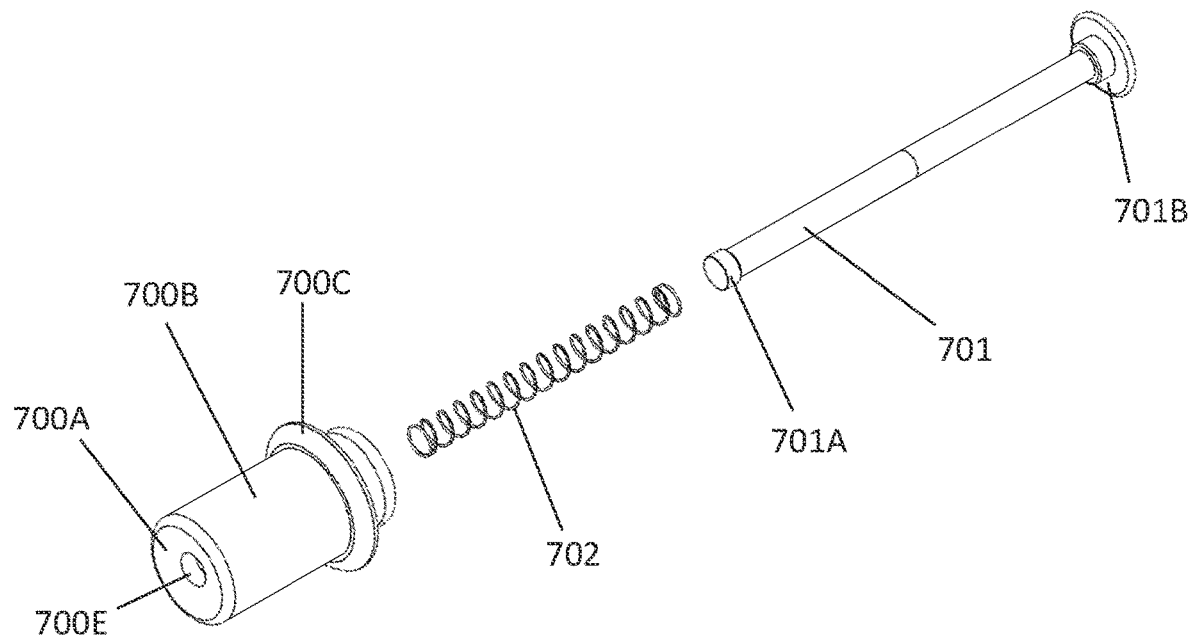
FIG. 15B depicts an exploded perspective view of one example of the Corn Baton module showing its components and features in greater detail, according to various embodiments of the present invention.

FIG. 15A and FIG. 15B illustrate in detail an example of one embodiment of the Corn Baton module (700). In this particular embodiment, when a corn cob is initially inserted into the Feeding Channel (600B), the corn cob may protrude from the top edge of the Feeding Channel (600B). To effectively push the corn cob in this particular scenario minimizing the possibility of the Corn Baton module (700) slipping off the tip of the corn cob, the face of the Corn Baton module (700) pushing on the corn cob (the "Front Face", 700A, FIG. 15B) is made concave.

In this particular embodiment, the Corn Baton module (700) comprises a cylindrical section (the "Baton Cylinder", 700B, FIG. 15B) with a slightly smaller diameter than the Feeding Channel (600B) so it can slide in and out of the Feeding Channel (600B) with ease. The length from the Front Face (700A) of the Baton Cylinder (700B) to the Baton Stopper (700C, FIG. 15B) is equal to the length of the Feeding Channel (600B), so the Baton Cylinder (700B) can push the corn cob almost completely into the Input Rollers (601) when the Baton Cylinder (700B) is fully inserted. The Baton Stopper (700C) prevents the Front Face (700A) of the Baton Cylinder (700B) from making contact with the Input Rollers (601).

The Corn Baton module (700) has a section (the "Baton Handle", 700D, FIG. 15A) extending from the Baton Stopper (700C). The Baton Handle (700D) allows the operator to hold the Corn Baton module (700) when initially pushing the corn cob inside the Machine.

In this particular embodiment, the Baton Cylinder (700B) has a cylindrical opening (the "Rod Channel", 700E, FIG. 15B) that extends from the Front Face (700A) to the flat face of the Baton Handle (700D). A rod with a slightly smaller diameter (the "Baton Rod", 701, FIG. 15B) passes through the Rod Channel (700E), extending from the Front Face (700A) of the Baton Cylinder (700B) and protruding from the Baton Handle (700D). The Baton Cylinder (700B) also serves as a guide to center the Baton Rod (701) when inserted into the machine. The Baton Rod (701) has a wider diameter section (the "Rod Stopper", 701A, FIG. 15B) at the side that lays flush with the Front Face (700A), and a wide disk on its opposite end (the "Rod Pusher" 701B, FIG. 15B). The Rod Stopper (701A) prevents the Baton Rod (701) from sliding further inside of the Baton Cylinder (700B). The Rod Pusher (701B) allows the operator to comfortably push the Baton Rod (701) making it slide through the Rod Channel (700E) and extend out from the Front Face (700A) to further push the corn cob inside the Machine. The Rod Channel (700E) also has a wider diameter section at the Front Face (700A) end, that allows the Rod Stopper (701A) to be inserted inside the Rod Channel (700E) flush with the Front Face (700A). The Baton Rod (701) is long enough to push the corn cob all the way through the Conical Grater module (400) and the Output Rollers (212) until the bare cob exits the Machine. The diameter of the Rod Stopper (701A) is small enough to pass through the center of the Conical Grater module (400), even with the Conical Grater Blades (404, FIG. 16A) fully closed, without touching them. In the same way, the Rod Stopper (701A) can pass through the center of the Output Rollers (212) without touching them.

In this particular embodiment, the Corn Baton module (700) has a Compression Spring (702, FIG. 15B) along the length of the Baton Rod (701), between the Baton Handle (700D) and the Rod Pusher (701B). This Compression Spring (702) has an inner diameter slightly larger than the Baton Rod (701), so the Baton Rod (701) can slide freely inside the coils of the Compression Spring (702) when pushed by the operator. This Compression Spring (702) maintains the Rod Pusher (701B) separated from the Baton Handle (700D) when not being pushed by the operator. This feature is not required for the operation of the Machine but facilitates its operation. On the flat side of the Baton Handle (700D), the Rod Channel (700E) has a section with a slightly larger diameter than the outside diameter of the Compression Spring (702). This section runs deep enough into the Baton Handle (700D) to allow the Compression Spring (702) to be fully housed inside the Baton Handle (700D) when the operator pushes the Baton Rod (701) all the way into the Machine.

Other embodiments of this module may perform the same function. One possible embodiment may have the Baton Cylinder (700B) integrated with the Baton Rod (701) as a single piece, where the Baton Rod (701) pushes the corn cob, and the Baton Cylinder (700B) serves as a guide to center the Baton Rod (701) as it is inserted into the machine.

The Corn Baton module (700) may be made of aluminum, metal alloy, hard plastic, or other suitable food grade material. The Compression Spring (702) may be made of stainless steel, hard plastic, or other suitable food grade material.

Figure 16A:
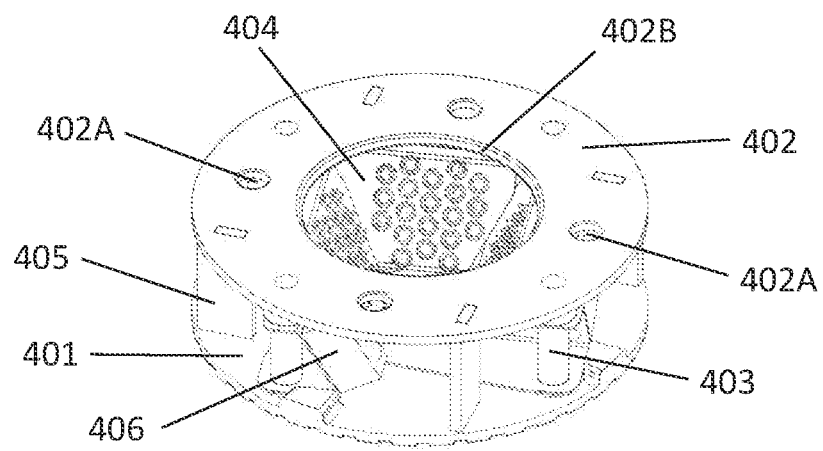
FIG. 16A depicts a perspective top view of one example of the Conical Grater module showing in greater detail its components and features, according to various embodiments of the present invention.
Figure 16B:
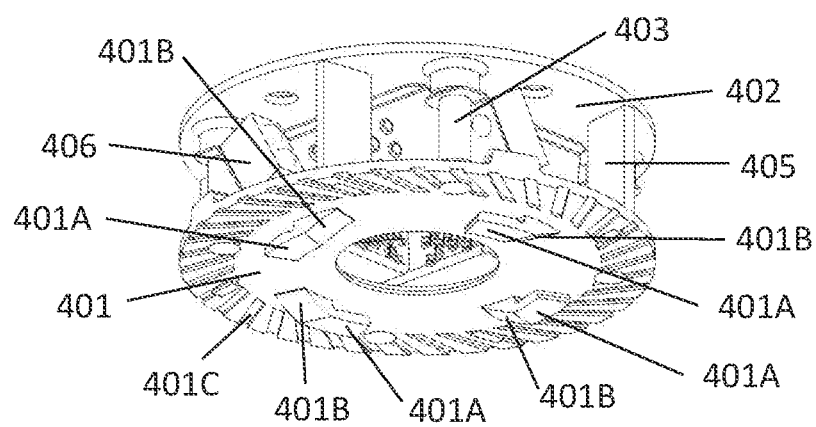
FIG. 16B depicts a perspective bottom view of one example of the Conical Grater module showing in greater detail its components and features, according to various embodiments of the present invention.

FIG. 16A and FIG. 16B illustrate an example of one embodiment of the Conical Grater module (400), also referred to as the Grater, which in this particular embodiment, comprises two disks with various components between them. Each disc has a circular opening in the center through which the corn cob passes. The Conical Grater module (400) connects to the Grater Seat (210), laying inside the Grater Housing (300D) as described in previous sections. The bottom disk (the "Bottom Disk", 401, FIG. 16B), has a number of grooves on its outside face (the "Grater Grooves", 401C, FIG. 16B), that are skewed with respect to the radius of the circumference of the disk. When the Conical Grater module (400) is rotating at high speed, the Grater Grooves (401C) help to push into the Grater Housing (300D) any content (corn paste or other) that may try to escape the Grater Housing (300D) through its circular bottom opening instead of the Discharge Channel (300E). To maximize this effect, the Conical Grater module (400) rotates at a close distance from the inner bottom face of the Grater Housing (300D).

The diameter of the circular opening on the center of the Bottom Disk (401) of the Conical Grater module (400) is large enough to allow a bare cob to pass through it. In the same way, the diameter of the circular opening (the "Grater Aperture", 402B, FIG. 16A) on the center of the Top Disk (402, FIG. 16A) is large enough to allow a corn cob not yet grated to pass through it.

Figure 16C:
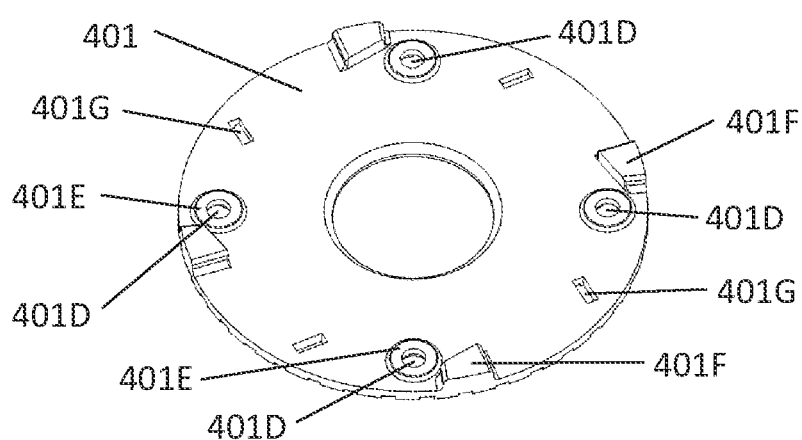
FIG. 16C depicts additional features of the Bottom Disk of the Conical Grater module according to various embodiments of the present invention.

In this particular embodiment, the Bottom Disk (401) has four circular openings (the "Bottom Disk Pin Holes", 401D, FIG. 16C) through which the Conical Grater Pins (403, FIG. 16B) are inserted. The Top Disk (402) has similar circular openings for the same purpose. Around the four Bottom Disk Pin Holes (401D), four wide rings (the "Blade Seats", 401E, FIG. 16C) protrude from the top face of the Bottom Disk (401) to provide support for the Conical Grater Blades (404). The Blade Seats (401E) maintain the Conical Grater Blades (404) away from the Bottom Disk (401) while the four Conical Grater Blades (404) are moving during operation as later described herein.

Four blocks (the "Blade Stoppers", 401F, FIG. 16C) also protrude from the top face of the Bottom Disk (401). The Blade Stoppers (401F) prevent the Conical Grater Blades (404) from rotating excessively inwards and their location and geometry determine the minimum size of the passage left at the center of the Conical Grater module (400) when the Machine is in operation.

In this particular embodiment, the Bottom Disk (401) and the Top Disk (402) are interconnected by four vertical pieces (the "Sweeper Blades", 405, FIG. 16A) and four Conical Grater Pins (403). The Sweeper Blades (405) are inserted into four rectangular slots (the "Sweeper Slots", 401G, FIG. 16C) located on the Bottom Disk (401) and Top Disk (402). The Sweeper Blades (405) remove the corn paste off the walls of the Grater Housing (300D) pushing it to exit the Centrifuge module (300) through the Centrifuge Discharge Chanel (300E). The Sweeper Blades (405) are skewed with respect to the radius of the circumference of the Bottom Disk (401) and Top Disks (402), so that when the Conical Grater module (400) is rotating at high speed, the Sweeper Blades (405) create an air flow that helps to prevent any content (corn paste or other) from escaping the Centrifuge module (300) through its circular bottom opening. This air flow also helps to move the corn paste or other grated material inside the Centrifuge module (300) towards the Centrifuge Discharge Chanel (300E).

The Bottom Disk (401), Top Disk (402) and the Sweeper Blades (405) may be made of aluminum, metal alloy, hard plastic, or other suitable food grade material.

Figure 17:
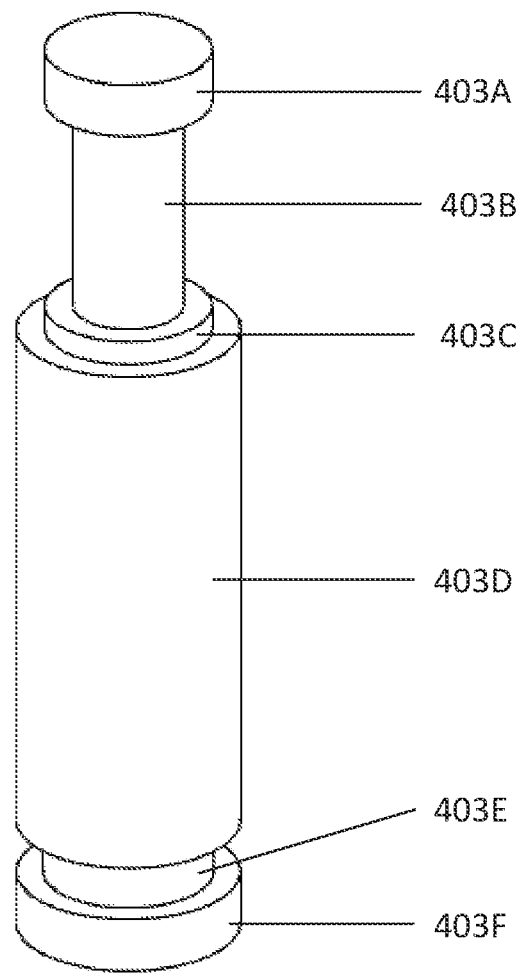
FIG. 17 depicts a perspective view of one example of the Conical Grater Pin showing in greater detail some of its features according to various embodiments of the present invention.
Figure 18:
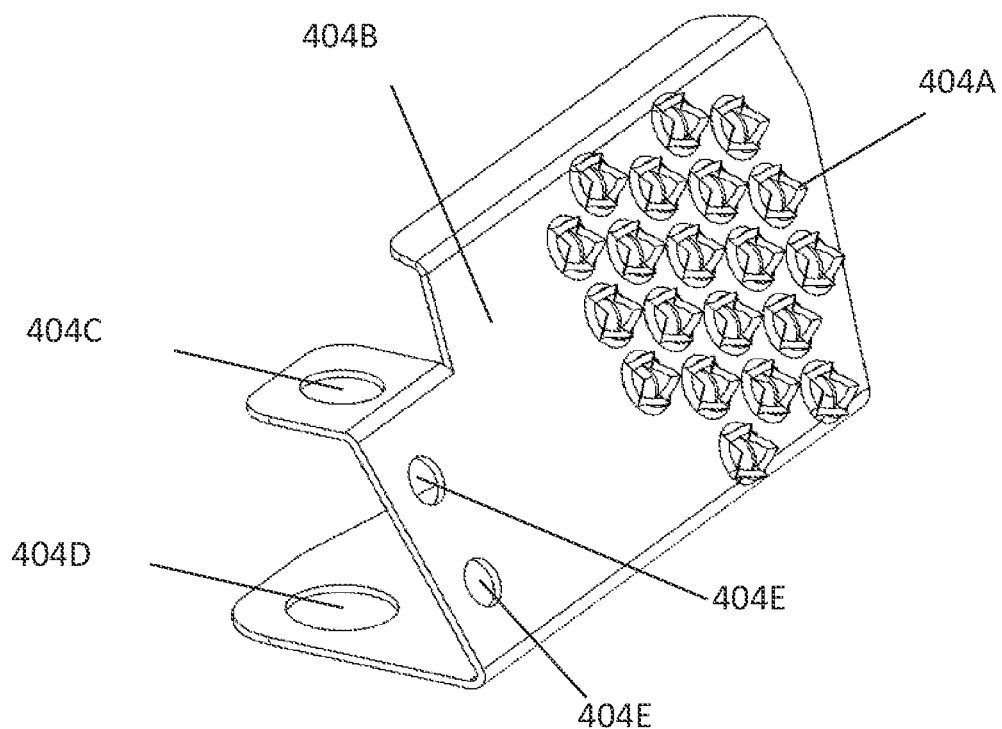
FIG. 18 depicts a perspective view of one example of the Conical Grater Blade showing in greater detail some of its features according to various embodiments of the present invention.

The Conical Grater Pins (403) provide a solid connection between the Bottom Disk (401) and the Top Disk (402) and at the same time, provide support and a point of rotation for the Conical Grater Blades (404). The geometry of the Conical Grater Pin (403) is shaped with sections at different diameters according to its various functions. On this particular embodiment, the Top Disk Holder section (403A, FIG. 17) (shown already riveted), is riveted during the factory assembly of the Conical Grater module (400) to hold the Top Disk (402) in place. The Top Disk Neck section (403B, FIG. 17) provides a guide for the Top Disk (402) to slide in position. The Blade Top Guide section (403C, FIG. 17) serves as a rotation axle for the Conical Grater Blade (404) Top Pin Hole (404C, FIG. 18). The Blade Bottom Guide section (403D, FIG. 17) serves as a rotation axle for the Conical Grater Blade (404) Bottom Pin Hole (404D, FIG. 18). The Bottom Disk Neck section (403E, FIG. 17) provides a guide for the Bottom Disk (401) to slide in position. The Bottom Disk Holder section (403F, FIG. 17) (shown already riveted) is riveted during the factory assembly of the Conical Grater module (400) to hold the Bottom Disk (401) in place.

The Conical Grater Pins (403) may be made of aluminum, metal alloy or other suitable food grade material. For this particular embodiment, stainless steel is recommended.

Figure 26A:
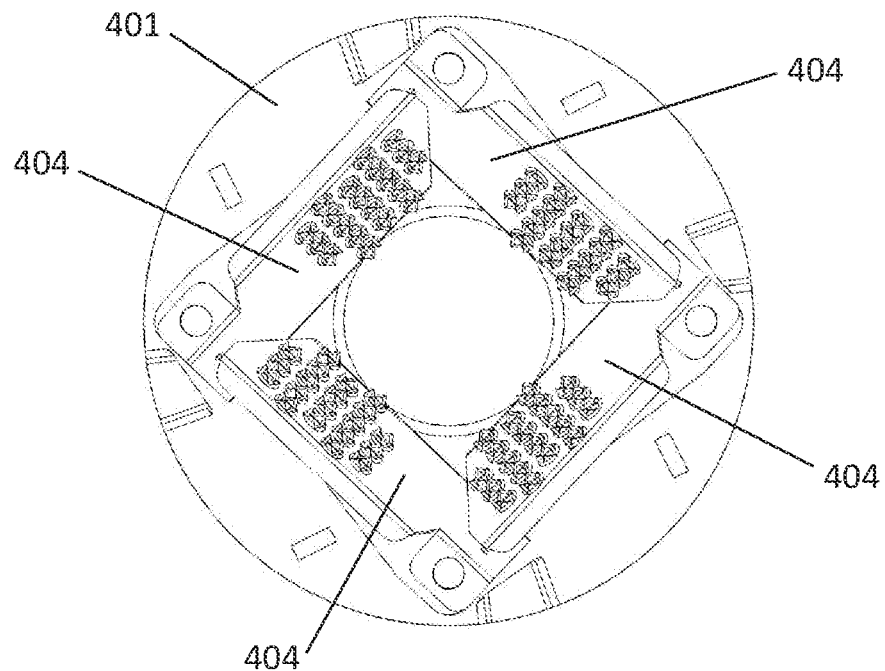
FIG. 26A depicts a top view of the Bottom Disk of the Conical Grater module with the four Conical Grater Blades at their fully open position, according to various embodiments of the present invention.
Figure 26B:
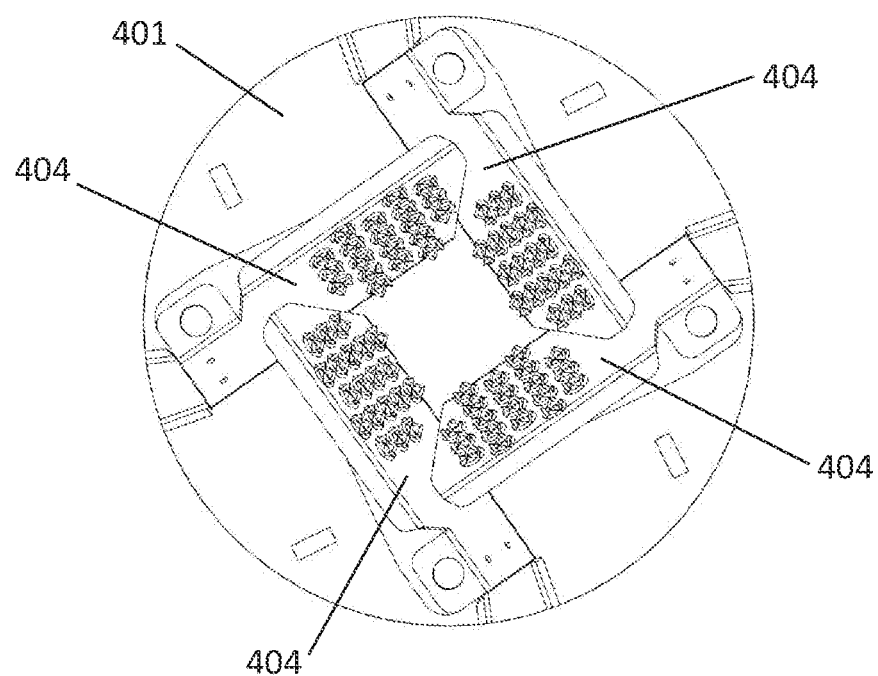
FIG. 26B depicts a top view of the Bottom Disk of the Conical Grater module with the four Conical Grater Blades at their fully closed position, according to various embodiments of the present invention.
Figure 27:
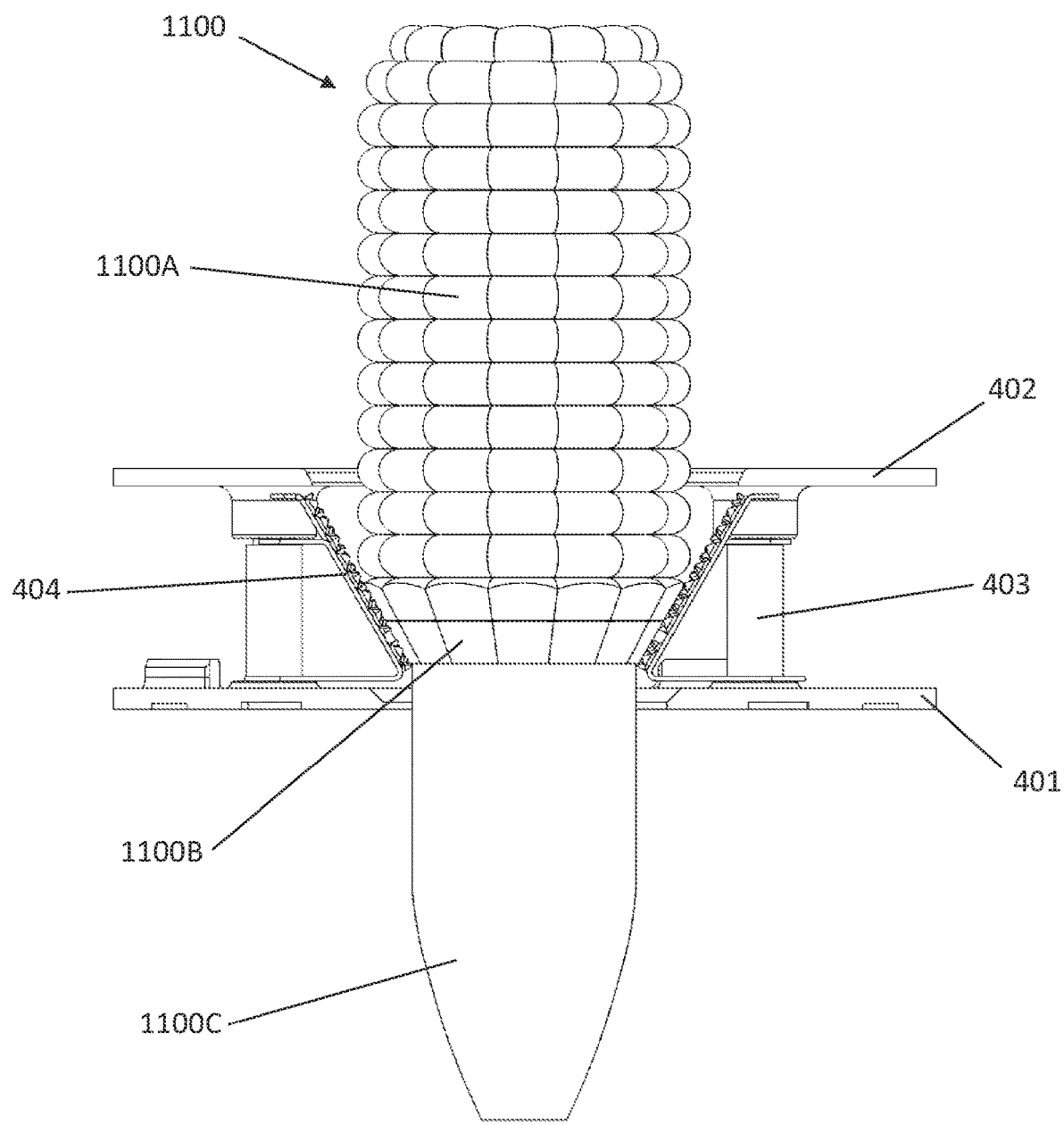
FIG. 27 depicts a section view of the Conical Grater module with an ear of corn being grated by the Conical Grater Blades, according to various embodiments of the present invention.

The Conical Grater Blades (404) grate the corn cob kernels to create the corn paste. In this particular embodiment, each of the four Conical Grater Blades (404) has two circular openings (the "Top Pin Hole", 404C) and the "Bottom Pin Hole", 404D, the "Pin Holes") through which the Conical Grater Pins (403) are inserted. The Conical Grater Blades (404) pivot around the Conical Grater Pins (403) and by doing so, the faces of the Conical Grater Blade (404) (the "Grating Face", 404B, FIG. 18) where the Conical Grater Blade Teeth (404A, FIG. 18) are located, move closer or farther away from the center of the circular opening of the Conical Grater module (400), decreasing or increasing the size of the passage created by the four Conical Grater Blades (404), through which the corn cob passes to be grated. FIG. 26A shows a top view of the four Conical Grater Blades (404) at their fully open position and FIG. 26B shows a top view of the four Conical Grater Blades (404) at their fully closed position. This movement allows the Conical Grater Blades (404) to follow the corn cob contour for an optimal grating result. To allow the corn cob to push the Conical Grater Blades (404) away from the center opening of the Conical Grater module (400) as the corn cob moves through it, the Grating Face (404B) is skewed with respect to the line of movement of the corn cob. This feature also allows the corn kernels to be grated progressively as the corn cob is inserted into the Conical Grater module (400) resulting in a smoother grating process. FIG. 27 shows a section view of the Conical Grater module (400) with an ear of corn (1100, FIG. 27) being grated. The corn cob portion above the Conical Grater module (400) shows all the Kernels intact (1100A, FIG. 27). The Kernels (1100A) are progressively grated when they contact the Conical Grater Blades (404), creating a conical profile (the "Grating Profile", 1100B, FIG. 27) that results in a smooth grating process. After exiting the Conical Grater module (400), all that is left of the corn cob is the Bare Cob (1100C, FIG. 27).

In the particular embodiment herein illustrated, the Conical Grater Blade Teeth (404A) are aligned vertically with an offset from column to column so that there are no spaces without teeth from top to bottom when the Grating Face (404B) is observed sideways. In this particular embodiment, the Conical Grater Blade Teeth (404A) are shaped as round holes with four triangular spikes protruding from the edge of each hole. Other embodiments of this invention may use a different distribution and shape of teeth, to achieve different corn paste textures, all of which are within the scope of this invention.

The Conical Grater Blades (404) may be made of a metal alloy sheet or other suitable food grade material. For this particular embodiment, a stainless-steel sheet is recommended.

In this particular embodiment, each Conical Grater Blade (404) has a small block (the "Counterweight", 406, FIG. 16A) attached to the Grating Face (404B). The Counterweight (406) is located near the Pin Holes (404C and 404D). In the particular embodiment represented herein, the Counterweights (406) are attached to the Grating Face (404B) using two rivets (407, FIG. 19) that run through the Rivet Holes (404E, FIG. 18) located on the Grating Face (404B). Different means of attachment may be also used, or, in other embodiments, the Counterweight (406) could be built as a single piece with the Conical Grater Blade (404).

The Counterweight (406) is attached to the Conical Grater Blade (404) in such a position with respect to the Conical Grater Pin (403), that the center of mass of the Counterweight (406) lays on the opposite side to the center of mass of the Conical Grater Blade (404) relative to the position of the Conical Grater Pin (403). The weight of the Counterweight (406) is large enough so that when the Conical Grater module (400) starts rotating at high speed, the centrifugal force created by the Counterweights (406) overcomes the centrifugal force created by the Conical Grater Blades (404), forcing the Conical Grater Blades (404) to pivot around the Conical Grater Pin (403), moving the section where the Conical Grater Blade Teeth (404A) are located, towards the center circular opening of the Conical Grater module (400), which allows the corn cob to be grated as it passes through the passage created by the four Conical Grater Blades (404) at the center of the Conical Grater module (400).

The Counterweight (406) may be made of metal alloy or other suitable food grade material. For this particular embodiment, stainless steel is recommended.

Figure 32:
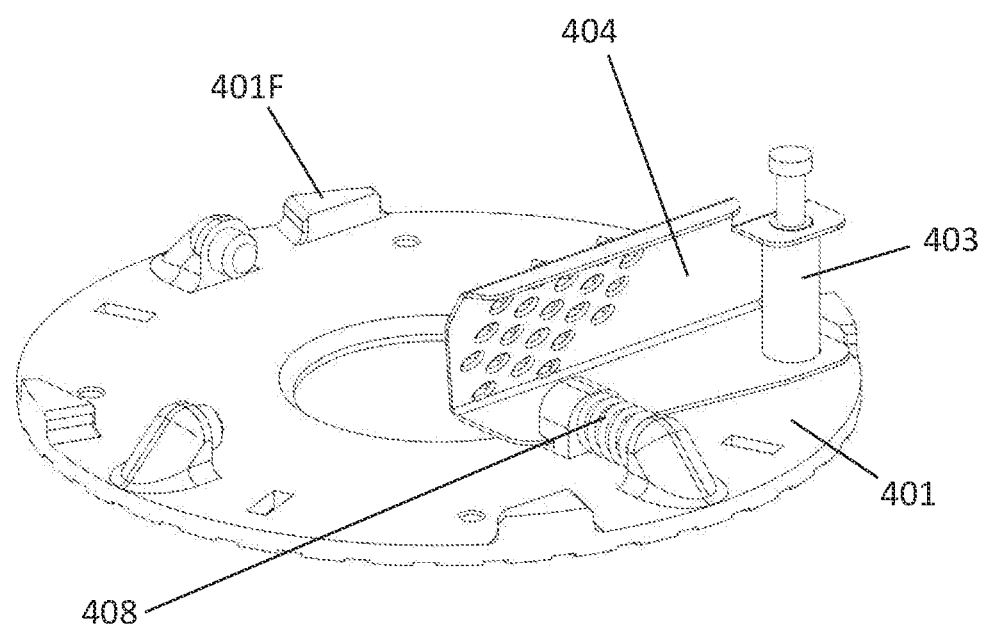
FIG. 32 depicts a perspective view of one example of some components of the grater module where a grater blade is biased towards the center of the grater by a spring.

Alternative embodiments of this invention may use different means to push the Conical Grater Blades (404) towards the center of the circular opening of the Conical Grater module (400), all of which are within the scope of this invention. In these alternative embodiments, the Counterweight (406) may not be required. One possible option may include the use of a spring (408, FIG. 32).

Figure 19:
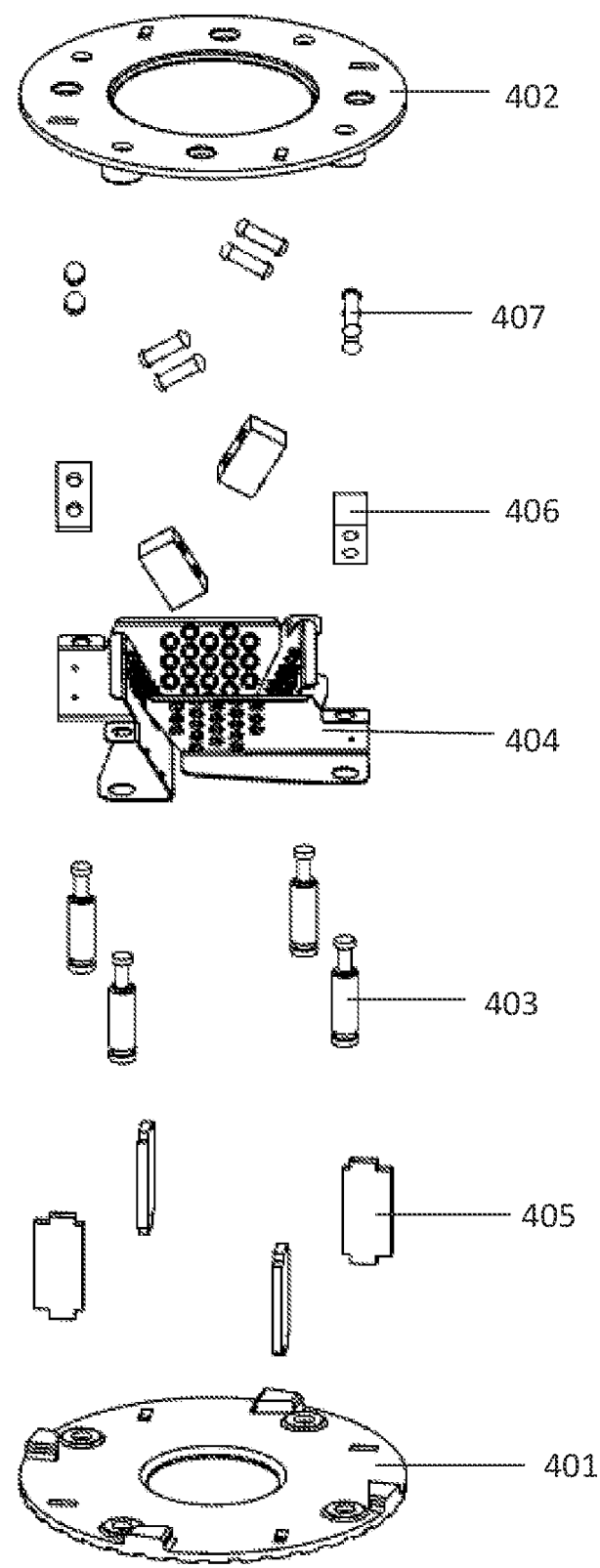
FIG. 19 depicts an exploded perspective view of one example of the components comprising the Conical Grater module according to various embodiments of the present invention.

For added clarity, FIG. 19 provides an exploded perspective view of one example of the Conical Grater module (400) showing all its components according to this particular embodiment.

Figure 20A:
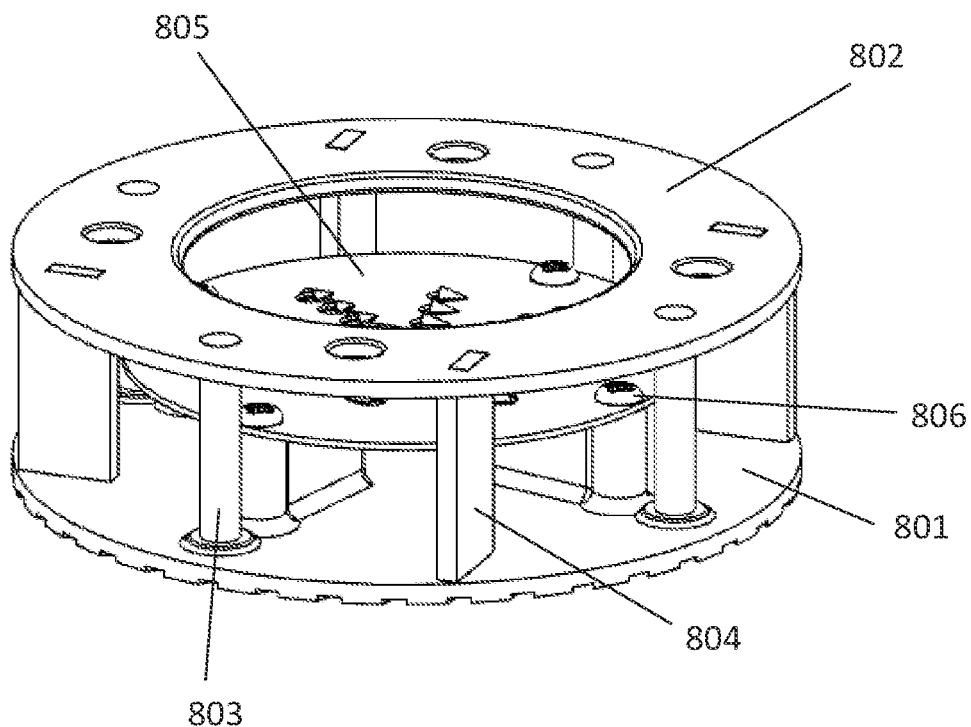
FIG. 20A depicts a perspective view of one example of the Flat Grater module showing some of its components and features, according to various embodiments of the present invention.

FIG. 20A illustrates one example of the Flat Grater module, also referred to as the Grater, (800, FIG. 2). The Flat Grater module (800) is used to grate vegetables or other suitable products. In this particular embodiment, this module is interchangeable with the Conical Grater module (400), so both modules have many similarities but also some differences.

On the Flat Grater module (800), the bottom face of its Bottom Disk (801, FIG. 20A) has all the same features and functionalities described in previous sections for the Conical Grater module (400), except that, on the Flat Grater module (800) the Bottom Disk (801) does not have a center circular opening. The two modules also share four similar Sweeper Blades (804, FIG. 20A) and four pins (the "Flat Grater Pins", 803, FIG. 20A), but in the case of the Flat Grater module (800), the Flat Grater Pins (803) only function is to provide a solid connection between the Bottom Disk (801) and the Top Disk (802, FIG. 20A). In consequence, the geometry of the Flat Grater Pins (803) is different from the geometry of the Conical Grater Pins (403).

Figure 21:
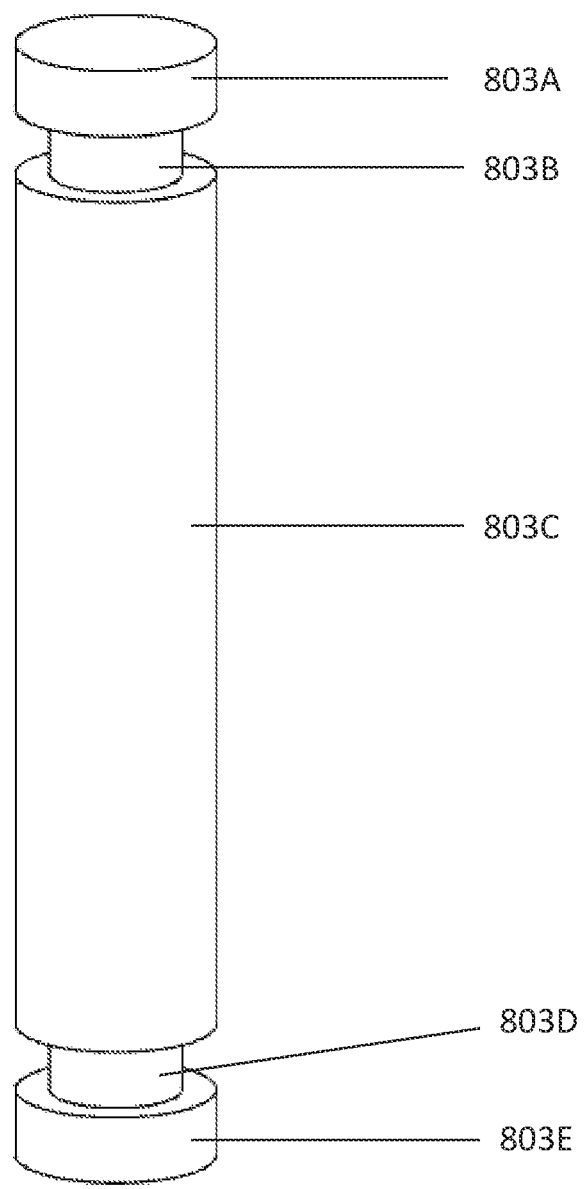
FIG. 21 depicts a perspective view of one example of the Flat Grater Pin showing in greater detail some of its features according to various embodiments of the present invention.

An example of one embodiment of the Flat Grater Pin (803) is shown in greater detail in FIG. 21. In this particular embodiment, the Top Disk Holder section (803A, FIG. 21) (shown already riveted), is riveted during the Flat Grater module (800) factory assembly to hold the Top Disk (802) in place. The Top Disk Neck section (803B, FIG. 21) provides a guide for the Top Disk (802) to slide in position. The Disk Spacer section (803C, FIG. 21) establishes the required distance between the Bottom Disk (801) and the Top Disk (802). The Bottom Disk Neck section (803D, FIG. 21) provides a guide for the Bottom Disk (801) to slide in position. The Bottom Disk Holder section (803E, FIG. 21) (shown already riveted) is riveted during the Flat Grater module (800) factory assembly to hold the Bottom Disk (801) in place.

Figure 20B:
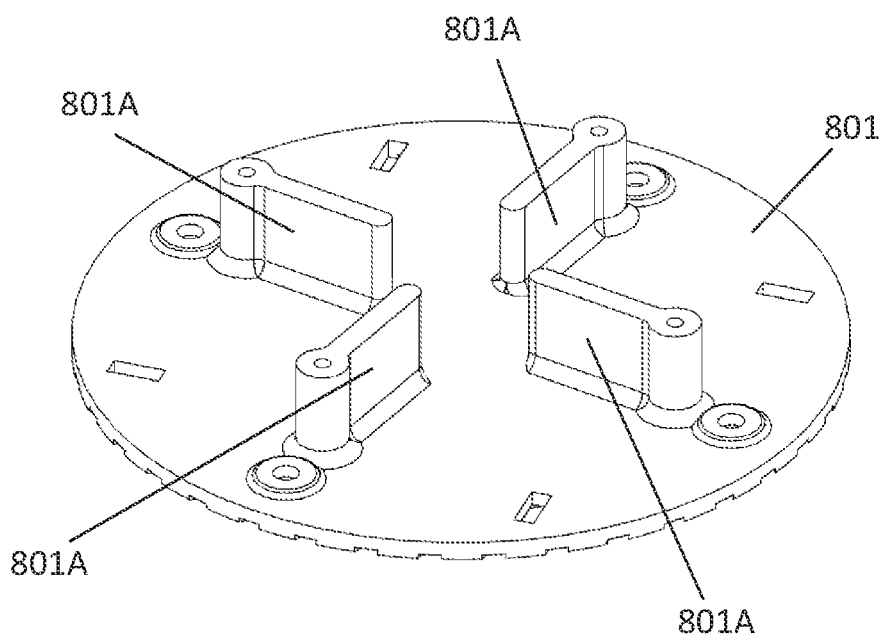
FIG. 20B depicts in greater detail some additional features of the Bottom Disk of the Flat Grater module, according to various embodiments of the present invention.

In this particular embodiment, the top face of the Bottom Disk (801) has four radial protruding segments (the "Blade Seats", 801A, FIG. 20B) spaced 90 degrees from each other. The Blade Seats (801A) do not reach the center nor the perimeter of the disk. Their function is to provide support to the Flat Grater Blade (805, FIG. 20A), allowing it to lay separated from the Bottom Disk (801) with enough clearance for the grated products to fall loosely. In the particular embodiment herein illustrated, the Flat Grater Blade (805) is secured onto the Blade Seats (801A) by four screws (the "Screws", 806, FIG. 20A) that run through the Mounting Holes (805B, FIG. 22). Other embodiments of this module may secure the Flat Grater Blade (805) in place by other means and are all within the scope of this invention.

Figure 22:
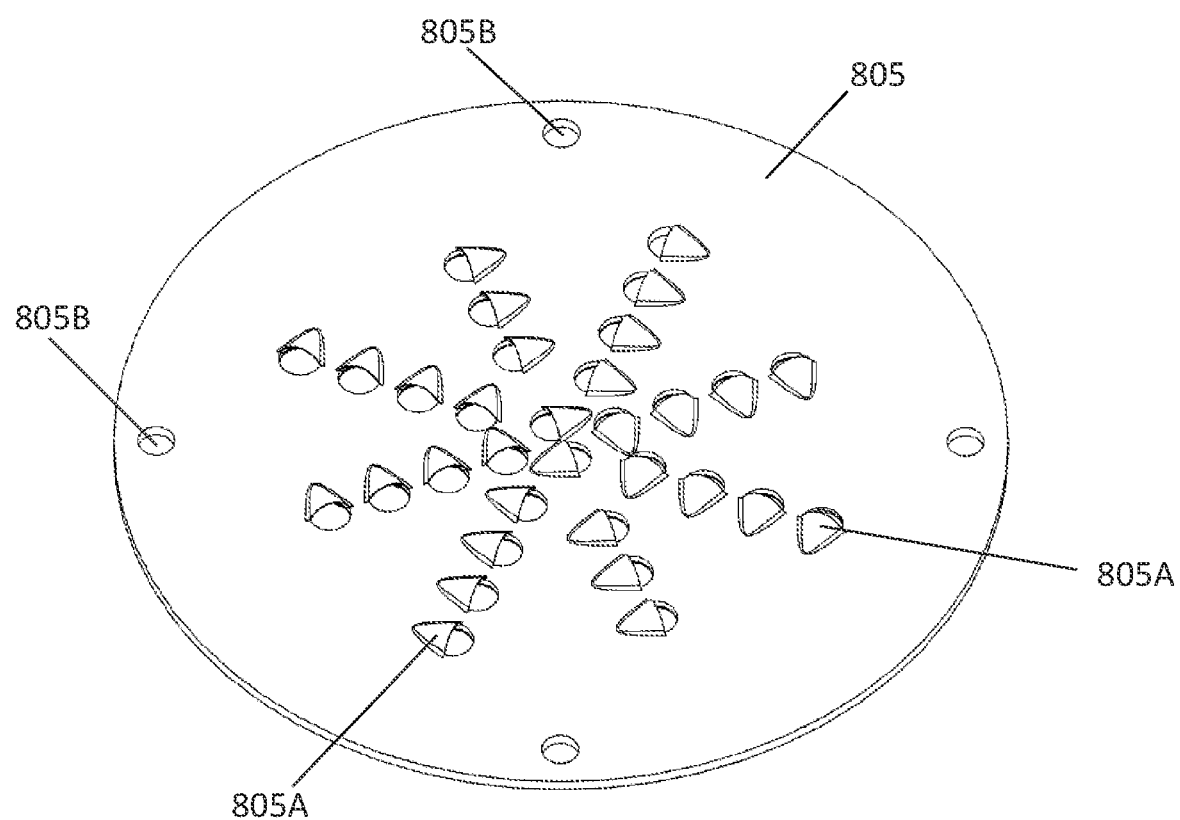
FIG. 22 depicts a perspective view of one example of the Flat Grater Blade showing in greater detail some of its features according to various embodiments of the present invention.

In the particular embodiment herein described and shown in detail in FIG. 22, the Flat Grater Blade (805) has a circular shape with the Flat Grater Teeth (805A, FIG. 22) distributed along several radial lines. The distance from the center of the Flat Grater Blade (805) to the teeth is different from line to line, so that when the Flat Grater Blade (805) is rotating, there are no spaces without teeth along the radius of the Flat Grater Blade (805). In the particular embodiment herein illustrated, the Flat Grater Teeth (805A) are shaped as a circle where one half of the circle is missing, creating a semicircular hole, and the other half is bent upwards from the surface of the Flat Grater Blade (805), creating a semicircular cutting edge. Different distribution, shape and size of teeth are desired for different grating requirements and are all within the scope of this invention.

In this particular embodiment of the Flat Grater module (800), the Top Disk (802) has all the same characteristics and functionalities earlier described for the Top Disk (402) of the Conical Grater module (400), except that, on the Flat Grater module (800), the center circular opening of the Top Disk (802) has a larger diameter, enough to allow the Funnel Sleeve module (900, FIG. 2) to pass through the circular opening without touching its edge.

The Flat Grater Blade (805) may be made of a metal alloy sheet or other suitable food grade material. In this particular embodiment, a stainless-steel sheet is recommended. The Flat Grater Pins (803) may be made of aluminum, metal alloy or other suitable food grade material. In this particular embodiment, stainless steel is recommended. The Flat Grater Bottom Disk (801), the Top Disk (802) and the Sweeper Blades (804) may be made of aluminum, metal alloy, hard plastic, or other suitable food grade material.

Figure 31:
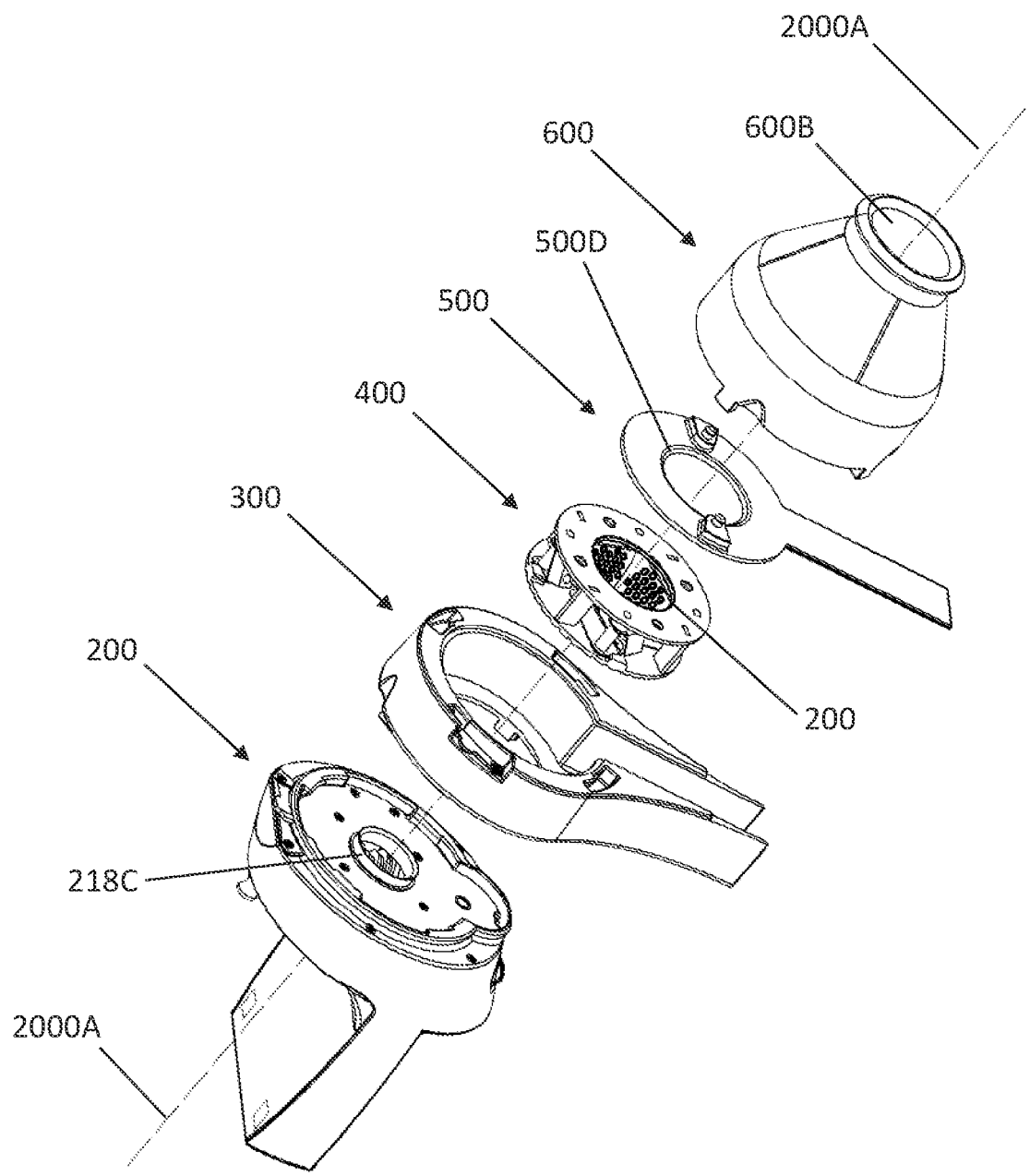
FIG. 31 depicts an exploded perspective view of one example of the funnel module, the centrifuge cover module, the grater module, the centrifuge module, and the main body module, coaxially aligned along the central axis.

The feeding channel (600B), the socket (218C), the grater aperture (402B) and the centrifuge cover aperture (500D) are all coaxial centered around the Central Axis (2000A, FIG. 31).

Figure 23A:
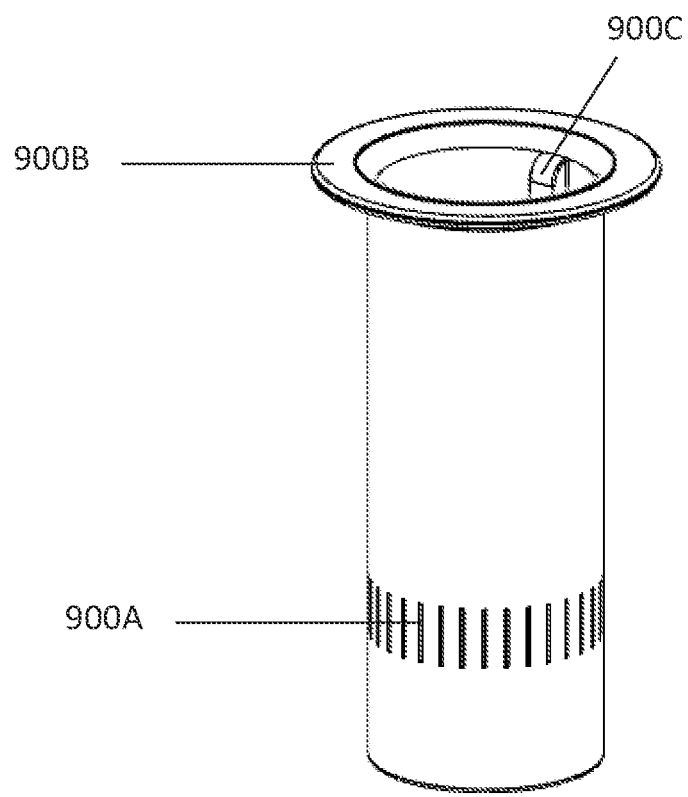
FIG. 23A depicts a perspective view of one example of the Funnel Sleeve module according to various embodiments of the present invention.
Figure 23B:
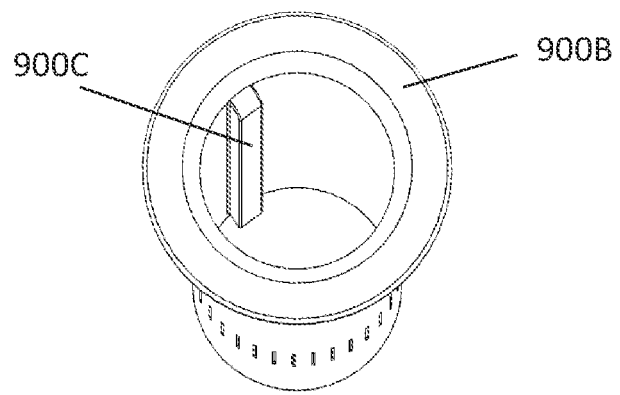
FIG. 23B depicts a perspective top view of one example of the Funnel Sleeve module showing in greater detail some of its features, according to various embodiments of the present invention.

FIG. 23A and FIG. 23B illustrate an example of one embodiment of the Funnel Sleeve module (900). The Funnel Sleeve module (900) is intended to be used only in combination with the Flat Grater module (800). It cannot be used with the Conical Grater module (400). When the Funnel Sleeve module (900) is inserted by the operator all the way into the Feeding Channel (600B), it protrudes from the bottom of the Funnel module (600). To install the Funnel Sleeve module (900), the Input Rollers (601) must be pushed away from each other to allow the Funnel Sleeve module (900) to pass between them. When the Machine is fully assembled and the Funnel Sleeve module (900) is fully inserted, the bottom of the Funnel Sleeve module (900) passes through the Centrifuge Cover Aperture (500D) and through the circular center opening of the Top Disk (802) of the Flat Grater module (800), reaching very close to the Flat Grater Teeth (805A).

In this particular embodiment, the Funnel Sleeve module (900) has grooves (the "Sleeve Grooves", 900A, FIG. 23A) around its outer perimeter and at a distance from the bottom edge so that when the Funnel Sleeve module (900) is fully inserted into the Feeding Channel (600B), the Input Rollers (601) firmly hold the Funnel Sleeve module (900) by the Sleeve Grooves (900A) preventing the Funnel Sleeve module (900) from rotating during operation. At the top of the Funnel Sleeve module (900) there is a wider flat section (the "Collar", 900B, FIG. 23A) that prevents the Funnel Sleeve module (900) from getting further inserted into the Feeding Channel (600B). The Collar (900B) is also used by the operator to grab and pull the Funnel Sleeve module (900) out of the Feeding Channel (600B) during disassembly. In addition, the Funnel Sleeve module (900) has on its inner face a square profile column (the "Sleeve Key", 900C, FIG. 23B) running from top to bottom. The purpose of the Sleeve Key (900C) will be later described herein.

Figure 24:
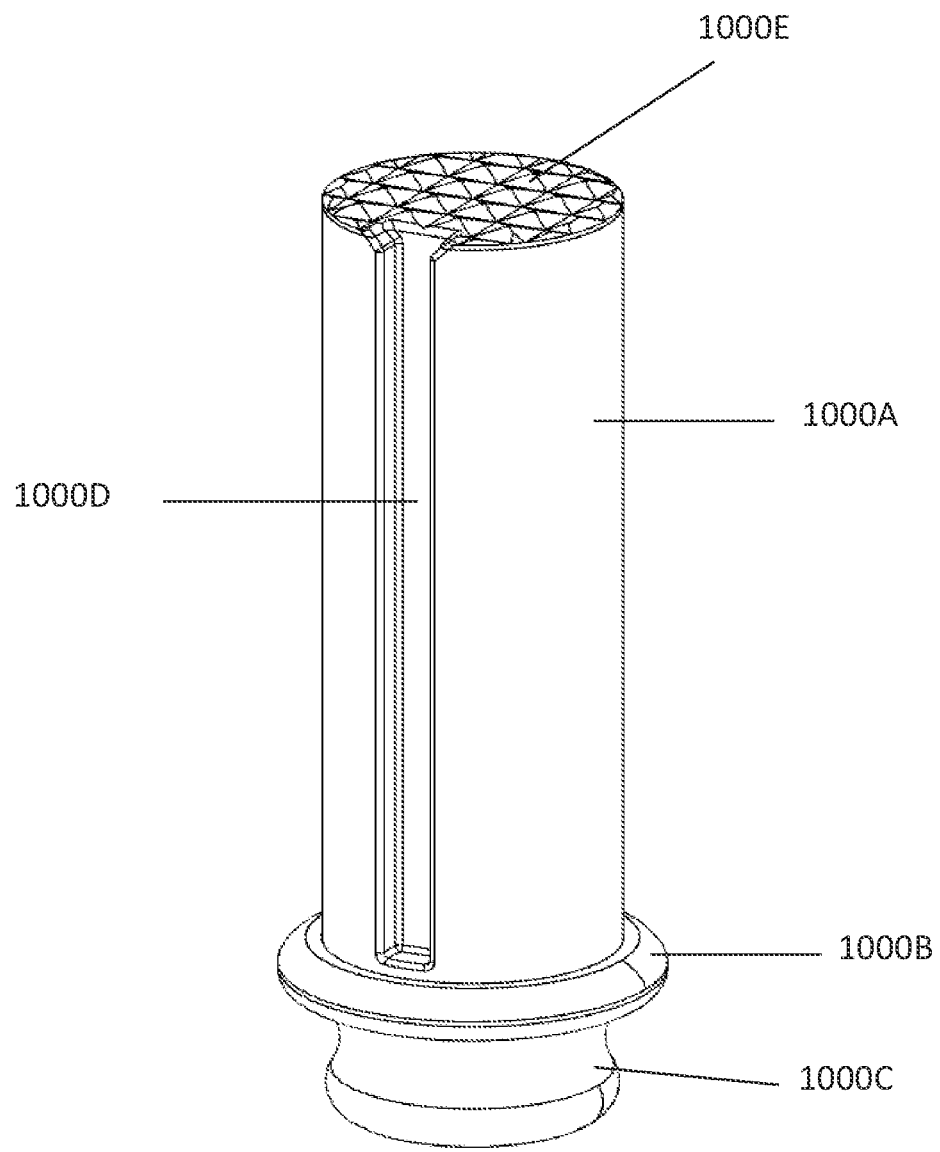
FIG. 24 depicts a perspective view of one example of the Flat Grater Baton module showing in greater detail some of its features according to various embodiments of the present invention.

In preferred embodiments of the present invention, the use of the Flat Grater module (800) requires the use of the Flat Grater Baton module (1000, FIG. 2) to push any suitable product against the Flat Grater Blade (805). Note that corn cobs cannot be grated with the Flat Grater Module (800). An example of one embodiment of the Flat Grater Baton module (1000) is shown on FIG. 24 in greater detail.

In this particular embodiment, the Flat Grater Baton module (1000) has a cylindrical section (the "Baton Cylinder", 1000A, FIG. 24) with a diameter slightly smaller than the inner diameter of the Funnel Sleeve module (900) so the Flat Grater Baton module (1000) can slide in and out of the Funnel Sleeve module (900) with ease. The length of the Baton Cylinder section (1000A) is equal to the length of the Funnel Sleeve module (900) and the Baton Stopper (1000B, FIG. 24) prevents the Flat Grater Baton module (1000) from getting further inserted inside the Funnel Sleeve module (900). Therefore, when fully inserted, the Flat Grater Baton module (1000) does not touch the Flat Grater Teeth (805A).

In this particular embodiment of the Flat Grater Baton module (1000), there is a section (the "Baton Handle", 1000C, FIG. 24) extending from the Baton Stopper (1000B), that is used by the operator to hold the Flat Grater Baton module (1000) during operation. The Flat Grater Baton module (1000) has a rough texture on the face that is in contact with the products being grated (the "Textured Face", 1000E, FIG. 24) to minimize the rotation movement of the products during the grating operation increasing in this way the effectiveness of the process. In this particular embodiment, the texture consists of a mesh of small square base pyramids, but many different geometries may be used on other embodiments, all of which are within the scope of this invention.

Another feature present on the particular embodiment of the Flat Grater Baton module (1000) described herein, is a square profile groove (the "Baton Groove", 1000D, FIG. 24) that runs along the length of the Baton Cylinder section (1000A). The profile of the Baton Groove (1000D) is slightly larger than the profile of the Sleeve Key (900C). This feature allows the Baton Groove (1000D) to slide over the Sleeve Key (900C) with ease when the Flat Grater Baton module (1000) is inserted and removed from the Funnel Sleeve module (900) preventing in this way the Flat Grater Baton module (1000) from rotating inside the Funnel Sleeve module (900) if during the grating operation any rotation force is transmitted from the product being grated to the Textured Face (1000E) of the Flat Grater Baton module (1000).

The Funnel Sleeve module (900) and the Flat Grater Baton module (1000) may be made of aluminum, metal alloy, hard plastic, or other suitable food grade material.

In this particular embodiment, the Machine is intended to be operated with the Power Switch (108) facing the operator as shown in FIG. 1. This results in the Feeding Channel (600B) to point towards the upper right-hand side direction and the bare cobs to exit the Machine on the lower left-hand side. The operator is encouraged to place his or her left hand over the Funnel module (600) while pushing the ears of corn with the Corn Baton module (700) or vegetables or other suitable products with the Flat Grater Baton module (1000) using his or her right hand. This mode of operation provides additional stability to the Machine during its use.

All surfaces of the Machine that may be in contact with the food being processed must be made of food grade materials. All metallic components that will be in contact with food or with water as a result of the Machine operation or cleaning after each use, must be made of rust resistant, food grade metals. Stainless steel is the preferred option for most metallic components.

While preferred materials for each element have been described, the device is not limited by these materials. Plastics, rubber, metal alloys, aluminum, and other materials may comprise some or all of the elements of the Electric Corn Creamer and Food Grater in various embodiments of the present invention.

An important version of the invention can be fairly described as a corn creamer device comprised of a motor base 100, a main body 200, a centrifuge 300, a grater 400 and a funnel 600. Generally, a motor 103 is disposed within the motor base 100. In some versions of the invention, the motor 103 may be substituted for a handcrank or a power takeoff on another motor device. The funnel 600 is comprised of a feeding channel 600B containing a plurality of corn contacting points 601. The corn contacting points can take the forms described above and may include, for example, rollers, points, guides or other features that tend to center an ear of corn within the feeding channel 600B and limit the rotation of the ear of corn axially within the feeding channel 600B. Each of the corn contacting points 601 is symmetrically oriented around a central axis 2000A to keep the ear of corn centered. The corn contacting points 601 are biased together toward the central axis 2000A and are spaced to contact the ear of corn as the ear of corn passes between the corn contacting points 601 through the center of the feeding channel 600B. The corn contacting points 601 are biased together to allow ears of corn of different diameter to pass through the feeding channel 600B and maintain contact with the corn contacting points 601. The grater 400 has a grater aperture 402B dimensioned to longitudinally receive the ear of corn 1100. The grater 400 is disposed within the centrifuge 300 and is operatively coupled to the motor 103 so that the grater 400 rotates within the centrifuge 300. Encircling the grater aperture 402B and affixed to the grater 400, are a plurality of grater blades 404 that are each affixed to a grater pin 403 around which each grater blade pivots. Each grater blade 404 has a grating face 404B that faces the grater aperture 402B. The grater blades 404 are each biased towards the rotational center of the grater aperture 402B causing each grating face 404B to simultaneously contact the ear of corn 1100. The centrifuge 300 is capped with the centrifuge cover 500 which has an aperture 500D dimensioned to longitudinally receive the ear of corn 1100. The centrifuge 300 has a discharge channel 300E through which a partial kernel of corn severed by any of the grater blades 404 is discharged. The main body 200 is comprised of a socket 218C and a plurality of cob contacting points 212. A socket 218C is dimensioned to longitudinally receive a bare cob 1100C. Each of the cob contacting points 212 are biased together and spaced to contact the bare cob 1100C, similar to the corn contacting points 601, described above. The bare cob 1100C passes between the cob contacting points 212 through the center of the socket 218C thereby preventing the ear of corn 1100 from rotating axially. The feeding channel 600B and the socket 218C and the grater aperture 402B and the centrifuge cover aperture 500D are all coaxially centered around the central axis 2000A. Optionally, while the motor 103 spins the grater 400, the grater blades 404 are biased toward the center of the grater 400 caused by centrifugal force affecting a counterweight 406 affixed to each grater blade 404. Optionally, the grater blades 404 are biased toward the center of the grater 400 by a spring 408. Optionally, a plurality of sweeper blades 405 are affixed radially to the grater 400 and rotate with the grater 400 to push the partial kernel of corn toward the discharge channel 300E. Optionally, a blade stopper 401F is provided for each grater blade 404 and is affixed to the grater 400 to limit a maximum inward bias of the respective grater blade 404. Optionally, any of the corn contacting points 601 and the cob contacting points 212 may be selected of any single type or combination of: rolling blades, rolling gears, rolling tines or sliding blades. Another important version of the invention can be fairly described as a method of creaming corn using any variation of the device described herein by inserting a first end of an ear of corn longitudinally into the feeding channel 600B then pushing a second end of the ear of corn to force the entire ear of corn through the grater 400 then collecting the partial kernel of corn at the discharge channel 300E and then removing the bare cob through the socket 218C.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by this description.

We claim:

1. A corn creamer comprises: a motor base, a main body, a centrifuge, a grater and a funnel;
a motor is disposed within the motor base;
wherein the funnel having a feeding channel containing a plurality of corn contacting points;
the feeding channel is dimensioned to longitudinally receive an ear of corn;
each of the plurality of corn contacting points is symmetrically oriented around a central axis; and
the plurality of corn contacting points are biased together and spaced to contact the ear of corn as the ear of corn passes between the plurality of corn contacting points through a center of the feeding channel thereby preventing the ear of corn from rotating axially;
wherein the grater has a grater aperture dimensioned to longitudinally receive the ear of corn;
the grater is disposed within the centrifuge and is operatively coupled to the motor so that the grater rotates within the centrifuge;
a plurality of grater blades is encircling the grater aperture; each of the plurality of grater blades is pivotally around affixed to a grater pin of the grater;
each of the plurality of grater blades has a grating face facing the grater aperture;
each of the plurality of grater blades is biased to pivot towards a rotational center of the grater aperture causing the grating faces to simultaneously contact the ear of corn;
wherein the centrifuge is capped with a centrifuge cover, the centrifuge cover has an aperture dimensioned to longitudinally receive the ear of corn; and
the centrifuge has a discharge channel through which a partial kernel of corn severed by any of the plurality of grater blades is discharged;
wherein the main body having a socket and a plurality of cob contacting points;
the socket is dimensioned to longitudinally receive a bare cob;
each of the plurality of cob contacting points is symmetrically oriented around the central axis; and
the plurality of cob contacting points are biased together and spaced to contact the bare cob as the bare cob passes between the plurality of cob contacting points through a center of the socket thereby preventing the ear of corn from rotating axially; and wherein the feeding channel, the socket, the grater aperture and the aperture of the centrifuge cover are all coaxially centered around the central axis.

2. The corn creamer of claim 1 further characterized as when the motor spins the grater, the plurality of grater blades are biased toward a center of the grater caused by a centrifugal force affecting a counterweight affixed to each of the plurality of grater blades.

3. The corn creamer of claim 1 further characterized as each of the plurality of grater blades is biased toward a center of the grater by a spring.

4. The corn creamer of claim 1 further characterized as a plurality of sweeper blades are affixed radially to the grater, and the plurality of sweeper blades rotate with the grater to push the partial kernel of corn toward the discharge channel.

5. The corn creamer of claim 1 further characterized as a blade stopper is provided for each of the plurality of grater blades, and the blade stopper is affixed to the grater to limit a maximum inward bias of the respective of each of the plurality of grater blades.

6. The corn creamer of claim 1 further characterized in that the plurality of corn contacting points and the plurality of cob contacting points are any of rolling blades, rolling gears, rolling tines or sliding blades.

7. A method of creaming corn comprises steps of:
providing a corn creamer having a motor base, a main body, a centrifuge, a grater and a funnel;
wherein a motor is disposed within the motor base;
wherein the funnel having a feeding channel containing a plurality of corn contacting points;
wherein the feeding channel is dimensioned to longitudinally receive an ear of corn;
wherein each of the plurality of corn contacting points is symmetrically oriented around a central axis;
wherein the plurality of corn contacting points are biased together and spaced to contact the ear of corn as the ear of corn passes between the plurality of corn contacting points through a center of the feeding channel thereby preventing the ear of corn from rotating axially;
wherein the grater has a grater aperture dimensioned to longitudinally receive the ear of corn;
wherein the grater is disposed within the centrifuge and is operatively coupled to the motor so that the grater rotates within the centrifuge;
a plurality of grater blades is encircling the grater aperture; each of the plurality of grater blades is pivotally affixed to a grater pin of the grater;
wherein each of the plurality of grater blades has a grating face facing the grater aperture;
wherein the each of the plurality of grater blades is biased to pivot towards a rotational center of the grater aperture causing the grating faces to simultaneously contact the ear of corn;
wherein the centrifuge is capped with a centrifuge cover, the centrifuge cover has an aperture dimensioned to longitudinally receive the ear of corn;
wherein the centrifuge has a discharge channel through which a partial kernel of corn severed by any of the plurality of grater blades is discharged;
wherein the main body having a socket and a plurality of cob contacting points;
wherein the socket is dimensioned to longitudinally receive a bare cob;
wherein each of the plurality of cob contacting points is symmetrically oriented around the central axis;
wherein the plurality of cob contacting points are biased together and spaced to contact the bare cob as the bare cob passes between the plurality of cob contacting points through a center of the socket thereby preventing the ear of corn from rotating axially;
wherein the feeding channel, the socket, the grater aperture and the aperture of the centrifuge cover are all coaxial centered around the central axis; wherein the method further comprising steps of inserting a first end of the ear of corn
longitudinally into the feeding channel;
pushing a second end of the ear of corn to force the ear of corn through the grater;
collecting the partial kernel of corn at the discharge channel;
removing the bare cob through the socket.

* * * * *